(12) United States Patent
Dutch

(10) Patent No.: US 11,321,899 B1
(45) Date of Patent: May 3, 2022

(54) 3D ANIMATION OF 2D IMAGES

(71) Applicant: Alexander Dutch, Austin, TX (US)

(72) Inventor: Alexander Dutch, Austin, TX (US)

(*) Notice: Subject to any disclaimer, the term of this patent is extended or adjusted under 35 U.S.C. 154(b) by 0 days.

(21) Appl. No.: 17/303,423

(22) Filed: May 28, 2021

(51) Int. Cl.
| | |
|---|---|
| *G06T 13/80* | (2011.01) |
| *G06T 17/00* | (2006.01) |
| *G06T 3/60* | (2006.01) |
| *G06T 11/20* | (2006.01) |
| *G06T 3/40* | (2006.01) |

(52) U.S. Cl.
CPC ............... *G06T 13/80* (2013.01); *G06T 3/40* (2013.01); *G06T 3/60* (2013.01); *G06T 11/20* (2013.01); *G06T 17/00* (2013.01)

(58) Field of Classification Search
None
See application file for complete search history.

(56) References Cited

U.S. PATENT DOCUMENTS

| | | |
|---|---|---|
| 5,674,198 A | 10/1997 | Leone |
| 6,434,278 B1 | 8/2002 | Hashimoto |
| 6,982,710 B2 | 1/2006 | Salomie |
| 7,116,341 B2 | 10/2006 | Ohto |
| 8,411,092 B2 | 4/2013 | Sheblak et al. |
| 8,791,942 B2 | 7/2014 | Rivers et al. |
| 8,792,708 B2 | 7/2014 | Shim |
| 8,913,107 B2 | 12/2014 | Huang |
| 8,941,642 B2 | 1/2015 | Tadaishi et al. |
| 9,196,076 B1* | 11/2015 | MacLeod ................ G06T 13/80 |
| 9,438,878 B2 | 9/2016 | Niebla, Jr. et al. |
| 9,990,760 B2 | 6/2018 | Aguilera Perez et al. |
| 10,204,422 B2 | 2/2019 | Gonzalez Aguirre et al. |
| 10,810,759 B2 | 10/2020 | Zimmerman et al. |
| 10,930,065 B2 | 2/2021 | Grant et al. |
| 2014/0002449 A1* | 1/2014 | Lu .......................... G06T 13/80 345/419 |
| 2016/0248984 A1* | 8/2016 | Li ............................ G06T 3/40 |
| 2020/0312037 A1 | 10/2020 | Kopeinigg et al. |
| 2021/0005003 A1 | 1/2021 | Chong et al. |

FOREIGN PATENT DOCUMENTS

| | | |
|---|---|---|
| KR | 100212545 | 8/1999 |
| KR | 100727034 | 6/2007 |
| KR | 101182206 | 9/2012 |

OTHER PUBLICATIONS

Gamefromscratch; "KenShape—3D Models from 2D Pixel Art! A New Tool from Kenney.nl;" Feb. 24, 2021; YouTube video: https://www.youtube.com/watch?v=IqMgBrDtvDc ; pp. 1-6. (Year: 2021).*

* cited by examiner

*Primary Examiner* — Peter Hoang
(74) *Attorney, Agent, or Firm* — Klemchuk LLP

(57) ABSTRACT

Disclosed herein are methods, computer apparatus, and computer programs for creating two-dimensional (2D) image sequences with the appearance of three-dimensional (3D) rotation and depth.

21 Claims, 16 Drawing Sheets

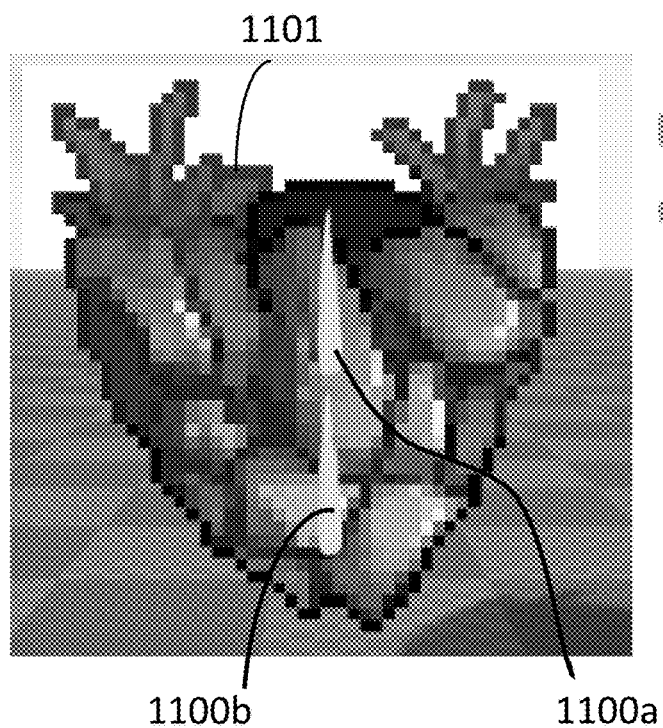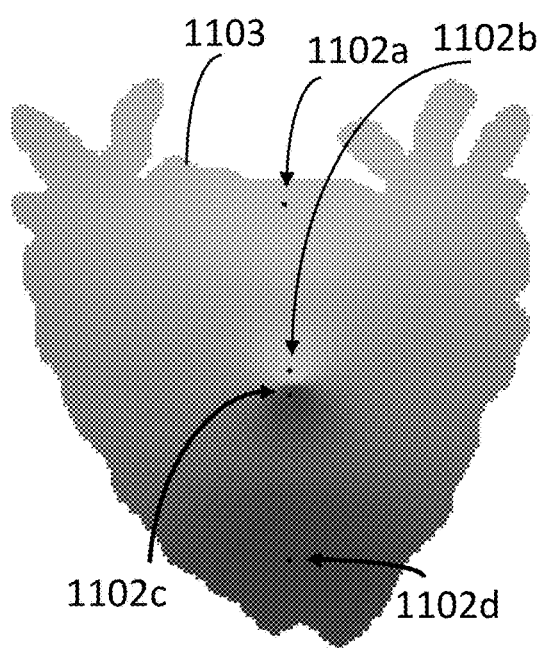
FIG. 11A
FIG. 11B

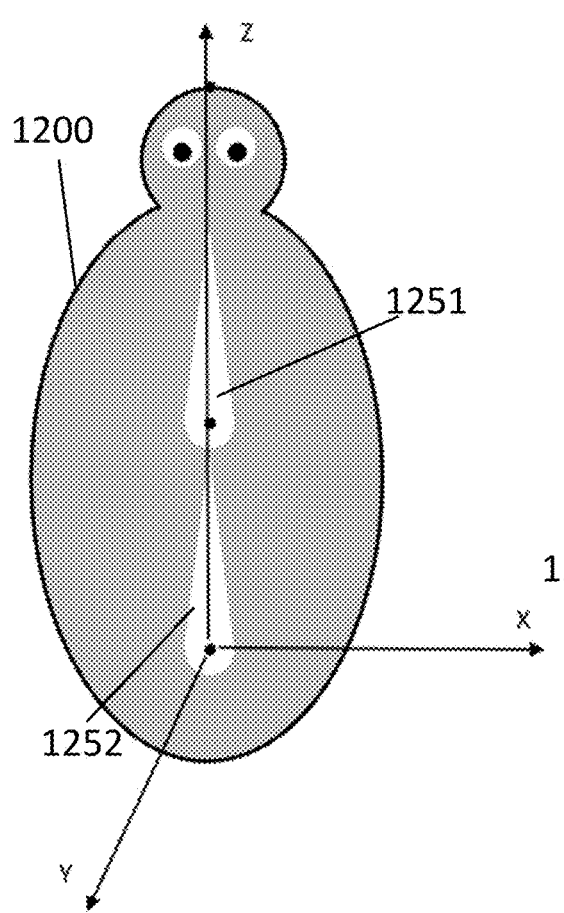
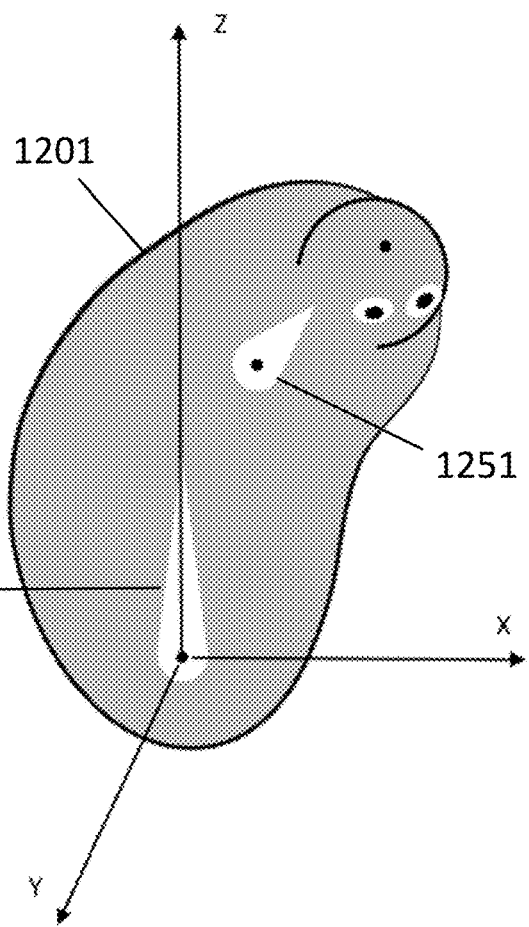
FIG. 12A
FIG. 12B

3D ANIMATION OF 2D IMAGES

TECHNICAL FIELD

The present disclosure generally relates to computer graphics and computer-based animation. More particularly, the present disclosure relates to techniques for creating three-dimensional (3D) rotation of two-dimensional (2D) images.

BACKGROUND

Computer-based animation has evolved to produce many different art styles, which can be seen across the entertainment industry in both movies and video games. Artists utilize both three-dimensional (3D) models and two-dimensional (2D) images to create expressive characters. In most cases these two art forms are kept separate, and 2D animation is handled separately from 3D animation.

2D and 3D art styles each offer advantages for an artist. 2D images are often simpler to produce than 3D models, and many conventions exist for creating 2D art with a stylized or cartoony aesthetic that would be difficult to recreated using a 3D model. 2D images also require much less storage space on a computer in comparison with 3D models, and they also require fewer processing resources when a scene is rendered by a computer's Graphics Processing Unit (GPU). On the other hand, 3D models offer the advantage of being view-independent, meaning that a single 3D model can be rendered from different viewpoints, as in the case where a camera pans around an object in a 3D scene. Using 3D models also allows an artist to take advantage of lighting effects and other modern 3D rendering techniques in order to create a scene that is visually stunning or photorealistic.

A growing trend in computer games is to utilize both 2D and 3D art styles in a single scene, creating a hybrid art style that is sometimes referred to as 2.5D. In this art style, 2D images such as characters may be placed in a 3D scene alongside 3D models such as terrain and objects. This technique allows an artist to leverage the advantages of both 2D and 3D art styles and can also lead to a visually unique art style. However, the 2.5D art style also raises new challenges, such as the need to view 2D characters from multiple viewpoints in 3D space as the 2D character moves around the scene or the scene moves around the 2D character. For example, a 2D character may face the camera and then turn to look away from it. Each of these poses (facing toward the camera and facing away from it) requires a different image of the 2D character to be drawn.

Creating 2D image animations that portray 3D rotation is known to be a very difficult task for an artist. Artists conventionally draw by hand each view of the 2D character that is needed to portray 3D rotation, which can require many hours of work and considerable skill in order to produce a result that looks convincingly 3D to a viewer. Thus, it is desirable to provide a computer-based technique that creates 2D views of a character from different viewpoints in a 3D space.

One technical solution that attempts to avoid conventionally drawing each view of the 2D character involves an artist creating a 3D model that resembles the desired 2D character. The 3D model is then rendered to the screen via a process on the computer's graphics processor (GPU) in such a way that it appears 2D. However, creating a 3D model may require a significant amount of time and is more complex than simply drawing the 2D character by hand, and the desired 2D aesthetic may be lost in the process. For example, a character's 2D cartoon facial features may be difficult to recreate on a 3D model.

SUMMARY

Artists conventionally draw by hand (e.g., on paper or on a computer screen) each view of the 2D character that is needed to portray a 3D rotation of the 2D character. Hand drawing can require many hours of work and considerable skill in order to produce a result that looks convincingly 3D to a viewer. Moreover, while 3D modeling can provide 3D rotation of the 2D character to avoid hand drawing the myriad 2D views, using a 3D model to produce 2D views trades one set of challenges for another.

The disclosed method, computer apparatus, and computer program provide a practical application and technical solution to the technical problems discussed above by producing a 2D animation sequence or individual 2D images that are rotated views of a 2D raster-art image i) without an artist having to draw by hand each view of the 2D character that is needed to portray 3D rotation, and ii) without requiring a 3D model. For example, computer processing power is reduced to produce the 2D animation sequence or individual 2D images that are rotated views of a 2D raster-art image when using no 3D model in the embodiments of the disclosed method, computer apparatus, and computer program.

The method can include one or more of: obtaining or receiving one or more 2D source images that represent the 2D raster-art image, mapping each 2D source image to one or more 3D transformation structures that reside in a 3D space, creating special purpose data structures, and producing one or more transformed 2D images based on the mapping, the special purpose data structures, or both the mapping and the special purpose data structures. In an aspect, this method uses no 3D model and thus computer processing power needed to perform the method, compared with that needed to execute 3D models, is reduced because the one or more transformed 2D images are produced based on the mapping, the special purpose data structures, or both the mapping and the special purpose data structures—and not on 3D models.

The computer apparatus can include one or more processors, a memory, and instructions stored on the memory that when executed by the one or more processors cause the one or more processors to perform one or more of: obtain or receive one or more 2D source images that represent the 2D raster-art image, map each 2D source image to one or more 3D transformation structures that reside in a 3D space, create special purpose data structures, and produce one or more transformed 2D images based on the mapping, the special purpose data structures, or both the mapping and the special purpose data structures. In an aspect, the processing power of the computer apparatus is reduced compared to computers that utilize 3D models because the one or more transformed 2D images are produced based on the mapping, the special purpose data structures, or both the mapping and the special purpose data structures—and not by 3D models.

The computer program comprising executable instructions stored in a non-transitory computer readable medium that when executed by a processor can cause the processor to perform one or more of: obtain or receive one or more 2D source images that represent the 2D raster-art image, map each 2D source image to one or more 3D transformation structures that reside in a 3D space, create special purpose data structures, and produce one or more transformed 2D images based on the mapping, the special purpose data structures, or both the mapping and the special purpose data structures. In an aspect, the processing power needed to execute the computer program is reduced compared to computer programs that utilize 3D models because the one or more transformed 2D images are produced based on the mapping, the special purpose data structures, or both the mapping and the special purpose data structures—and not by 3D models.

Another method can include one or more of: selecting a two-dimensional (2D) source image; selecting a three-dimensional (3D) transformation structure in the selected 2D source image; reading a three-dimensional (3D) transform of the 3D transformation structure; calculating a first three-dimensional (3D) pixel position for a first pixel in the 2D source image; applying the 3D transform of the 3D transformation structure to the first 3D pixel position; converting the first 3D pixel position to a first transformed two-dimensional (2D) pixel position; and drawing the first pixel to a transformed two-dimensional (2D) image, wherein the first pixel has the first transformed 2D pixel position in the transformed 2D image. In an aspect, this method uses no 3D model and thus computer processing power needed to perform the method, compared with that needed to execute 3D models, is reduced because the transformed 2D images is drawn based the above-recited steps—and not on 3D models.

Another computer apparatus can include one or more processors, a memory, and instructions stored on the memory that when executed by the one or more processors cause the one or more processors to perform one or more of: select a two-dimensional (2D) source image; select a three-dimensional (3D) transformation structure in the selected 2D source image; read a three-dimensional (3D) transform of the 3D transformation structure; calculate a first three-dimensional (3D) pixel position for a first pixel in the 2D source image; apply the 3D transform of the 3D transformation structure to the first 3D pixel position; convert the first 3D pixel position to a first transformed two-dimensional (2D) pixel position; and draw the first pixel to a transformed two-dimensional (2D) image, wherein the first pixel has the first transformed 2D pixel position in the transformed 2D image. In an aspect, the processing power of the computer apparatus is reduced compared to computers that utilize 3D models because the transformed 2D image is drawn based the above-recited functions—and not by 3D models.

Another computer program comprising executable instructions stored in a non-transitory computer readable medium that when executed by a processor can cause the processor to perform one or more of: select a two-dimensional (2D) source image; select a three-dimensional (3D) transformation structure in the selected 2D source image; read a three-dimensional (3D) transform of the 3D transformation structure; calculate a first three-dimensional (3D) pixel position for a first pixel in the 2D source image; apply the 3D transform of the 3D transformation structure to the first 3D pixel position; convert the first 3D pixel position to a first transformed two-dimensional (2D) pixel position; and draw the first pixel to a transformed two-dimensional (2D) image, wherein the first pixel has the first transformed 2D pixel position in the transformed 2D image. In an aspect, the processing power needed to execute the computer program is reduced compared to computer programs that utilize 3D models because the transformed 2D image is drawn based the above-recited functions—and not by 3D models.

BRIEF DESCRIPTION OF THE DRAWINGS

For a more complete understanding of this disclosure, reference is now made to the following description, taken in conjunction with the accompanying drawings, in which:

FIG. 11A illustrates two bones mapped to a 2D source image.

FIG. 11B illustrates a bone weight image that was produced by performing the bone weight calculation operation in FIG. 10 on the 2D source image of FIG. 11A.

FIG. 12A illustrates a 2D source image that was mapped to two 3D transformation structures (or bones).

FIG. 12B illustrates the effect of bone weight on a 2D transformed image that was produced from the 2D source image of FIG. 12A.

DETAILED DESCRIPTION

Figure 1:
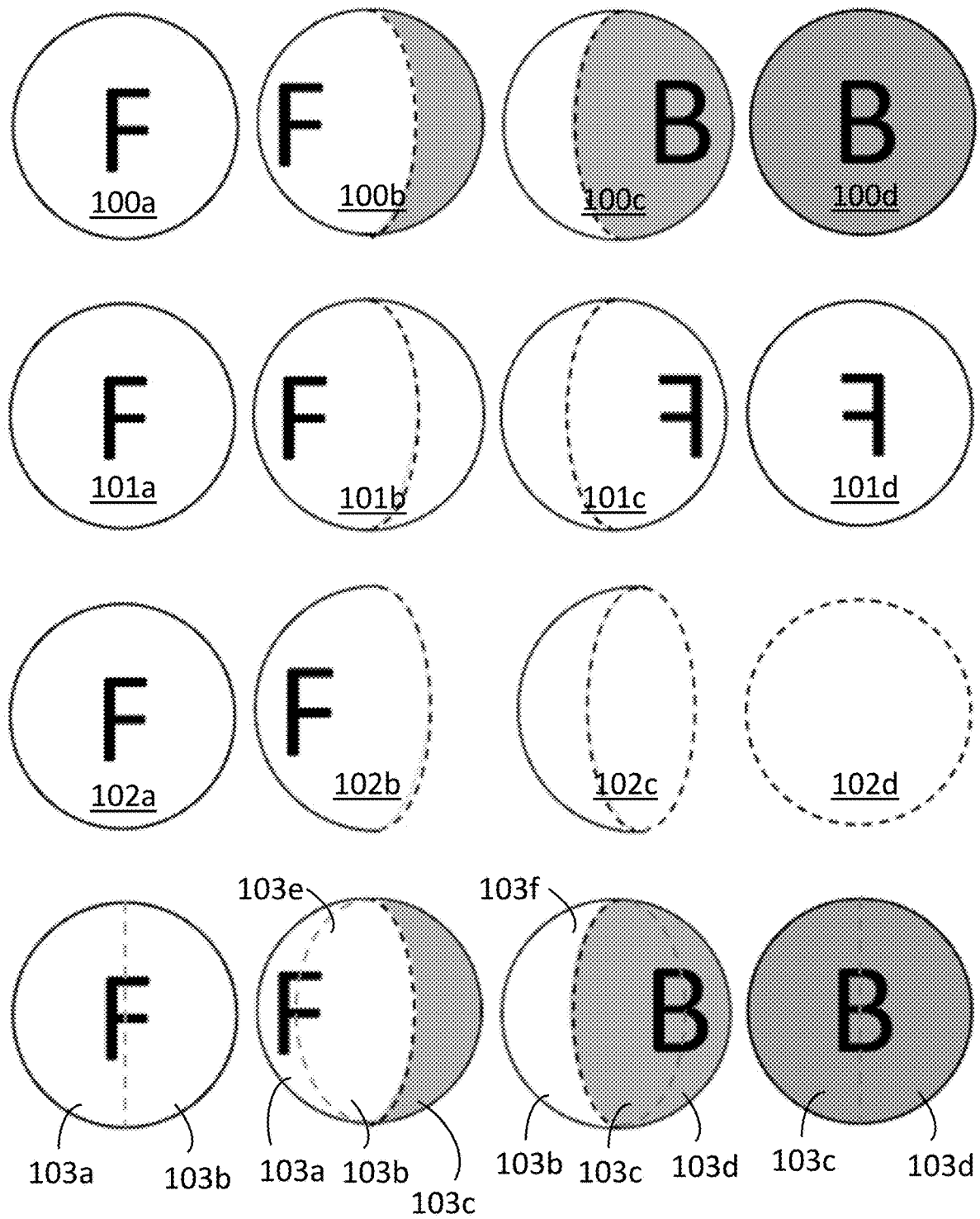
FIG. 1 illustrates four embodiments of 2D source images that can be used in the disclosed animation technique.

The terms "2D", "two dimension", and "two dimensional" as used herein are interchangeable and refer to two dimensions of a space, e.g., the X and Y, X and Z, or Y and Z coordinate space.

The terms "3D", "three dimension", and "three dimensional" as used herein are interchangeable and refer to the three dimensions of a space, e.g., the X, Y, and Z coordinate space.

The term "transformation" as used herein includes, but is not limited to, rotation, translation, scaling, distortion, or combinations thereof.

The term "raster-art" as used herein refers to any digital art image composed of pixels, as opposed to vector artwork that refers to any digital art image composed of mathematical lines and curves.

The method disclosed herein creates rotated views of a 2D raster-art image. The method involves 1) obtaining or receiving one or more 2D source images that represent the 2D raster-art image, 2) mapping each 2D source image to one or more 3D transformation structures that reside in a 3D space, 3) creating special purpose data structures, and 4) producing one or more transformed 2D images based on the mapping and the special purpose data structures. In the producing step, one or more transformed 2D images can be produced by applying one or more 3D transformations to one or more 3D transformation structures, in combination with the processing disclosed herein. Any 3D transformations applied to the 3D transformation structures during the producing step, including rotation, translation, scaling, and distortion, is reflected in a 2D transformed image that is generated by the producing step. As will be shown by example, the 2D transformed image appears convincingly to have rotated in three dimensions compared to the 2D source image, and appears to have depth. The technical improvements achieved by the disclosed method includes that the 2D transformed image is a 2D image that appears to have been rotated in 3D space 1) without use of a 3D model and 2) without drawing any 2D transformed image by hand.

The method can be implemented on a computer apparatus. Additionally, a computer program having executable instructions stored in a non-transitory computer readable medium that when executed by a processor causes the processor to perform the method disclosed herein.

2D Source Images

The 3D animation method described herein is applied to one or more 2D source images. In some aspects, the method can begin with obtaining or receiving one or more 2D source images. An artist or animation producer can create 2D image(s) of an object using a two-dimensionally-oriented graphics-authoring program such as Adobe Illustrator or Photoshop. Any object having any shape can be portrayed in the 2D images that can be used as the 2D source images as disclosed herein. These 2D image(s) can be stored as digital files in a database or datastore and can take the form of raster-graphic-oriented image files, such as .bmp, .jpeg, or .png image files. The disclosed method contemplates that one or more of these 2D image files can be obtained or retrieved by a computer apparatus executing the method from the database or datastore, and the 2D image file(s) can serve as the 2D source image(s). In aspects, the 2D source images are composed of pixels, and are thus pixel-based 2D images, also referred to as 2D raster-art images.

FIG. 1 illustrates multiple embodiments of 2D source images that can be obtained or received for use in the method. In the first embodiment, two 2D source images 100a and 100d are obtained or received. The first 2D source image 100a is a front side view of the object (which is labeled with an "F"), and the second 2D source image 100d is a back side view of the object (which is labeled with an "B"). Intermediate rotation image 100b and intermediate rotation image 100c show intermediate rotation views in which portions of both the first 2D source image 100a and the second 2D source image 100d are viewable. These intermediate rotation images 100b and 100c are examples of 2D transformed images that may be generated by the method disclosed herein.

In an alternative embodiment, one 2D source image 101a is obtained or received. The first 2D source image 101a is a front side view of the object (which is labeled with an "F"). A mirror image of the 2D source image 101a can be produced in this embodiment of the method, and the mirror image is the second 2D source image 101d (which is labeled with the mirror image of "F") that can be used in the method. That is, no 2D source image is provided for the back. Instead, the method mirrors the 2D source image 101a from the front side view in order to create a second 2D source image 101d for the back side view. Intermediate rotation image 101b and intermediate rotation image 101c show intermediate rotation views in which portions of both first 2D source image 101a and the second 2D source image 101d are viewable. These intermediate rotation images 101b and 101c are examples of 2D transformed images that may be generated by the method disclosed herein.

In another alternative embodiment, one 2D source image 102a is obtained or received. The 2D source image 102a is the only source image used in this embodiment of the method (which is labeled with an "F"). No source image is provided for the back side view, and a 2D back side source image is not generated in the method. With no back side source image, the front side view in the 2D source image 102a of the object forms a "shell," and rotating the object to face backward reveals portions of its interior, as seen in intermediate rotation image 102c and intermediate rotation image 102d. These intermediate rotation images 102b, 102c, and 102d are examples of 2D transformed images that may be generated by the method disclosed herein. This embodiment may be sufficient in cases where the back half of the object never rotates into view.

In another alternative embodiment, the front side view, the back side view, or both the front side view and the back side view can be composed of multiple images. In FIG. 1, this is illustrated in the bottom row of images 103a, 103b, 103c, and 103d. Two 2D source images 103a and 103b are used for the front side view (which is labeled which an "F"), and two 2D source images 103c and 103d are used for the back side view (which is labeled "B"). While two 2D source images 103a and 103b are illustrated for the front side view and two 2D source images 103c and 103d are illustrated for the back side view, alternative embodiments can use any number of 2D source images to compose the front side view (e.g., 1, 2, 3, 4, 5, or more 2D images) and the back side view (e.g., 1, 2, 3, 4, 5, or more 2D images) of the object. In other alternative embodiments using multiple images for the front side view and/or the back side view, the multiple images may or may not form a continuous or closed image surface (for example, an alternate embodiment may leave holes in the images so that the interior of the object is visible through the holes). Intermediate rotation images 103e and 103f are examples of 2D transformed images that may be generated by the method disclosed herein.

Figure 2:
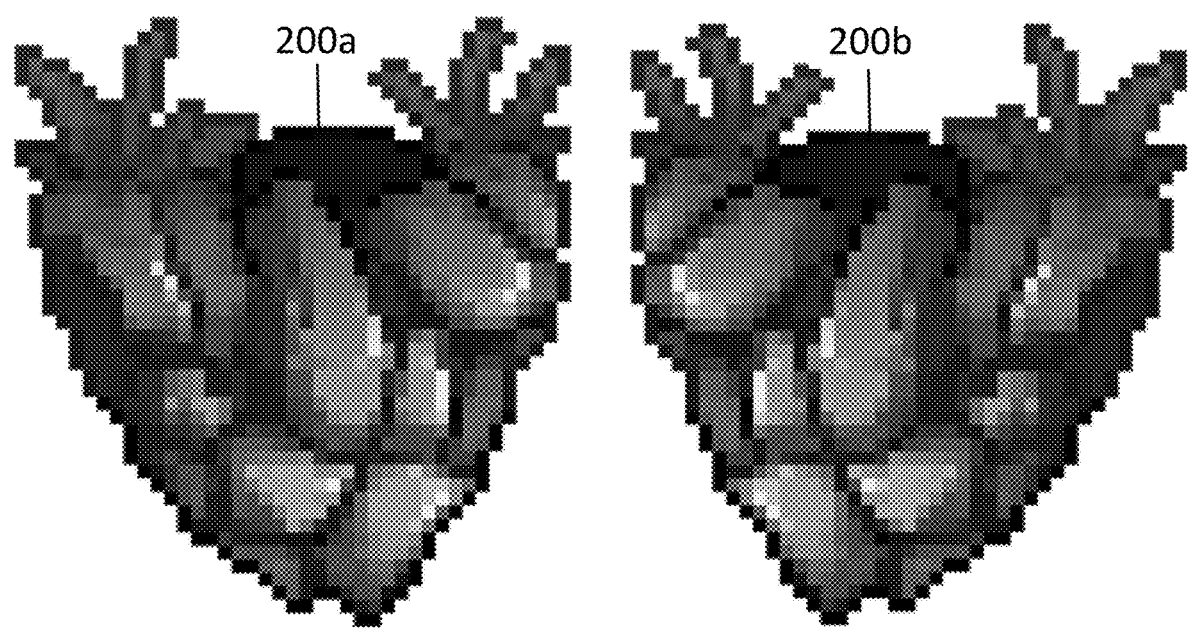
FIG. 2 illustrates side views of two exemplary 2D source images.
Figure 16:
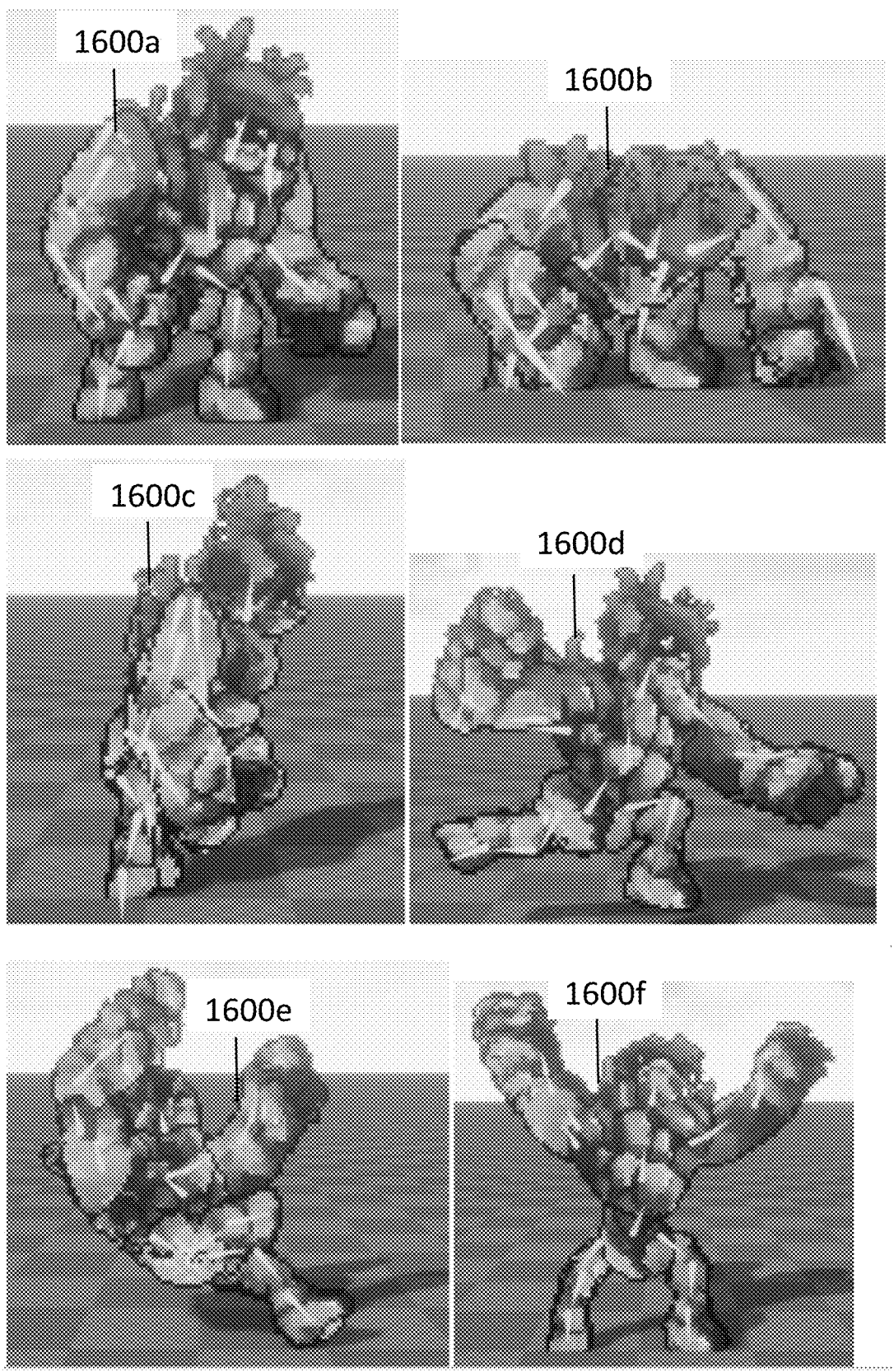
FIG. 16 illustrates an entire animation rig representing a character with multiple body parts. In each depiction, each body part has a 3D transformation applied in order to create a pose for the character as a whole.

FIG. 2 illustrates side views of two 2D source images 200a and 200b that are used as example 2D source images to describe the method disclosed herein. The object portrayed in the 2D source images 200a and 200b is chosen for explanatory purposes to be the torso of a 2D animated character. The full animated character with additional body parts is shown in FIG. 16. In FIG. 2, the first 2D source image 200a is a front side view, and the second 2D source image 200b is a back side view. Each of these 2D source images 200a and 200b will be rendered in the group of 2D transformed images produced during the production operation of the disclosed animation technique, and the second 2D source image 200b (the back side view) will be rotated 180 degrees in a 3D space so that it faces the opposite direction as the first 2D source image 200a (the front side view). This allows the triangle or heart-shaped object that is portrayed in the 2D source images 200a and 200b to be rotated in any direction and by any amount while maintaining a visible image at all times. In FIG. 2, the two 2D source images 200a and 200b have silhouettes that are mirror images of each other. In embodiments where the silhouette of the front side view of the 2D source image 200a and the silhouette of the back side view of the 2D source image 200b are mirror images, the silhouettes of the rendered 2D transformed images (rendered according to the technique disclosed herein) will align perfectly in embodiments where a 180-degree rotation (e.g., rotation is one type of transformation disclosed herein) is applied to second 2D source image 200b having the back side view. This ensures that the two 2D transformed images form a closed solid so that gaps are not visible between the two 2D images when a 3D transformation (e.g., a rotation) is applied to the object.

After obtaining or receiving the 2D source image or 2D source images, the method proceeds with processing the images via the following operations: a 3D transformation structure mapping operation in which the 2D source image(s) is mapped to one or more transformation structures in a 3D space; a utility data collection operation in which special purpose data structures are created, and a production operation in which the final transformed 2D image is produced based on the mapping operation and the utility data collection operation.

3D Transformation Structure Mapping Operation

One of the operations performed by the method is 3D transformation structure mapping. To discuss mapping, it is first needed to discuss a 3D transformation structure.

A 3D transformation structure, as disclosed herein, is defined as any minimum data set (for example, position values and rotation values) needed to express the desired 3D transformation(s) of the object in a 2D image.

Figure 3A:
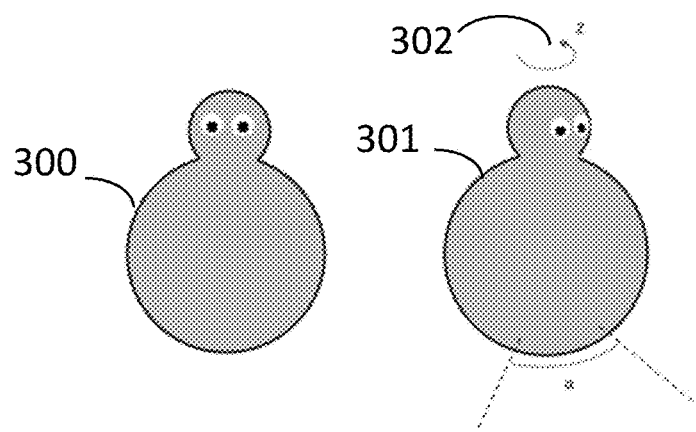
FIGS. 3A to 3C illustrate three examples of 3D transformation structures.
Figure 3B:
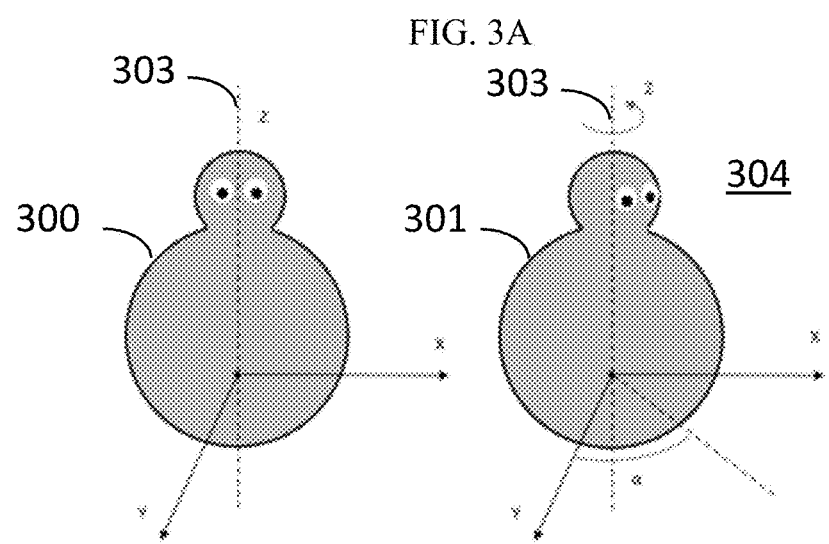
Figure 3C:
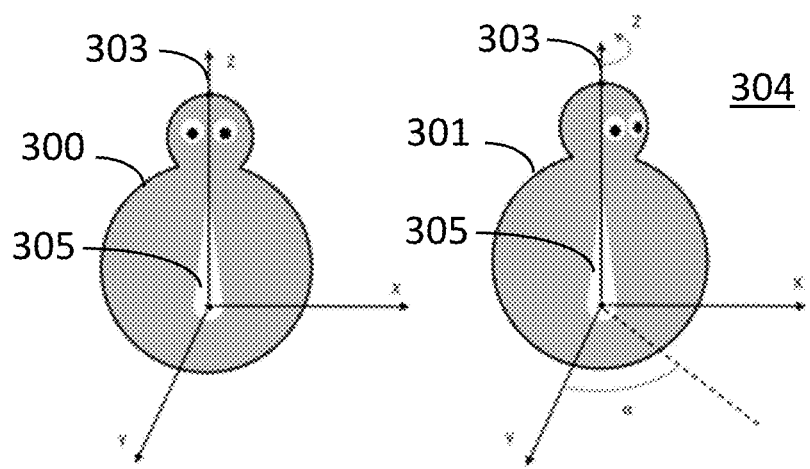

FIGS. 3A to 3C illustrate three examples of 3D transformation structures that are functionally equivalent when used to produce a given 3D transformation (in this case, the desired 3D transformation is a rotation about the Z axis). In each of FIGS. 3A to 3C, the object in 2D image 300 is the same object in 2D image 301. The object in 2D image 301 is rotated relative to the original position of the object in 2D image 300. That is, rotation is the form of transformation used in this explanation; however, the transformation can be any other type of transformation or combination of transformations as described herein.

A 3D transformation structure can include implicit or explicit 3D transformation structures. Any 3D transformation applied to any object in 3D space will similarly have a transformation structure that expresses the transformation, which may be either implicitly defined (e.g., as in FIG. 3A) or explicitly defined (as in FIG. 3B or 3C).

In FIG. 3A, a 3D transformation of an object is illustrated using an implicit 3D transformation structure. No explicit 3D transformation structure is given, but a rotation about an axis 302 of the object is still applied. This is an example of an implicit 3D transformation structure, in that, the transformation structure is an axis 302 that travels through the center point of the object, with direction parallel to the Z axis, about which the object is being rotated. With this implicit transformation structure defined by an axis of the object rather than an axis of a 3D space in which the object is contained, the object has rotated about axis 302 from the position shown in 2D image 300 to the position shown in 2D image 301 by a rotation amount of a (which can be any unit to measure the amount of rotation, such as degrees).

In FIG. 3B, another 3D transformation of the object is illustrated using an explicit 3D transformation structure. The 3D transformation structure is an axis (e.g., the Z axis 303 in FIG. 3B) having object position given by i) two coordinates (e.g., X coordinate and Y coordinate if the axis is Z axis 303) and ii) a direction in 3D space 304. This representation is sufficient to produce the desired 3D transformation of the object, because the Z position coordinate does not need to be defined in order to produce a rotation about the Z axis 303. With this explicit transformation structure defined by X and Y coordinates and by direction in the 3D space 304, the object has rotated about the Z axis 303 from the position shown in 2D image 300 to the position shown in 2D image 301 by a rotation amount of a.

In FIG. 3C, another 3D transformation of the object is illustrated using another explicit 3D transformation structure. The 3D transformation structure is a bone 305 having a position in 3D space 304 given by three coordinates X, Y, Z and a direction in 3D space 304. With this explicit transformation structure defined by the coordinates X, Y, Z and by direction in the 3D space 304, the object has rotated about the Z axis 303 from the position shown in 2D image 300 to the position shown in 2D image 301 by a rotation amount of a.

Figure 4:
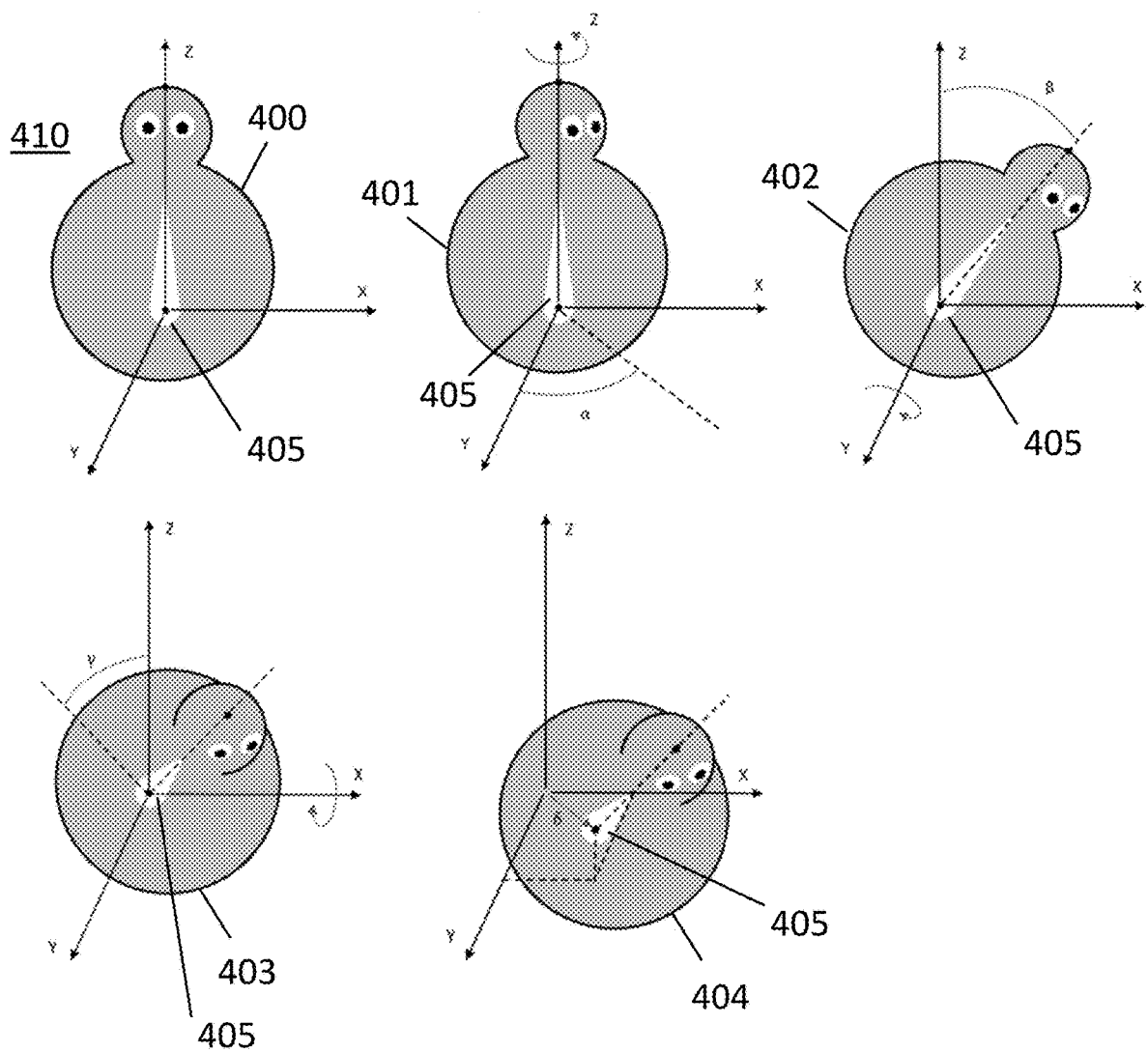
FIG. 4 illustrates an exemplary sequence of 3D transformations applied to an object in a series of 2D images in order to produce a transformed 2D image.

FIG. 4 illustrates an exemplary sequence of 3D transformations applied to an object in a series of 2D images 400, 401, 402 and 403 in order to produce a transformed 2D image 404. Each 2D image 400, 401, 402, 403, and 404 includes at bone 405, which as described in FIG. 3C, has a position in 3D space 410 given by three coordinates X, Y, Z and by direction in the 3D space 410. 2D image 400 shows the object in its default state, before transformations were applied. 2D image 401 shows the object rotated from the position shown in 2D image 400 by an amount α (alpha) about the Z axis to the position shown in 2D image 401, after a transformation of rotation about the Z axis was applied to 2D image 400. 2D image 402 shows the object then rotated from the position shown in 2D image 401 by an amount β (beta) about the Y axis to the position shown in 2D image 402, after a transformation of rotation about the Y axis was applied to 2D image 401. 2D image 403 then shows the object rotated from the position shown in 2D image 402 by an amount γ (gamma) about the X axis to the position shown in 2D image 403, after a transformation of rotation about the X axis was applied to 2D image 402. Finally, 2D image 404 shows the object translated from the position shown in 2D image 403 by an amount δ (delta) to the position shown in 2D image 404, after a transformation of translation was applied to 2D image 403. This sequence of four transformations produced the final 2D image 404, which reflects the transformations that were applied to the object in the 2D images 400, 401, 402, and 403.

The sequence of transformations shown in FIG. 4 can be represented and stored in many different ways, including but not limited to, a quaternion that represents the combined 3D transformation, a rotation matrix that represents the combined 3D transformation, a collection of rotation angles that can be used to replicate the sequence of transformations (such as Euler angles), or a combination thereof.

FIG. 4 uses a bone 405 to represent the 3D transformation structure of the 2D image 400, where the bone 405 has a position in 3D space 410 and a direction in 3D space 410 (e.g., the 3D transformation structure of the embodiment in FIG. 3C). This representation allows any combination of rotations and translations to be applied to the object.

Figure 5A:
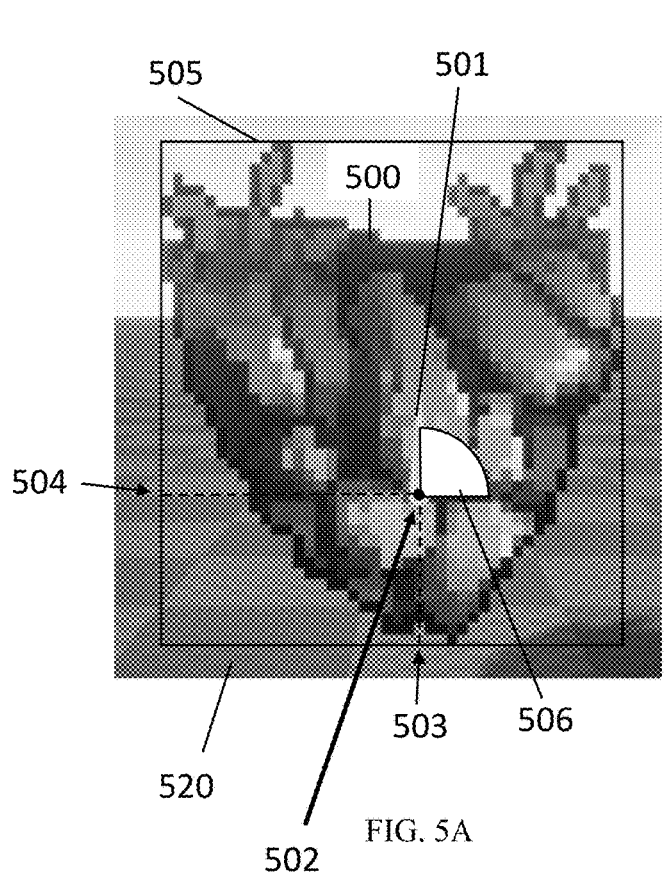
FIGS. 5A and 5B illustrate a 3D transformation structure mapping operation.
Figure 5B:
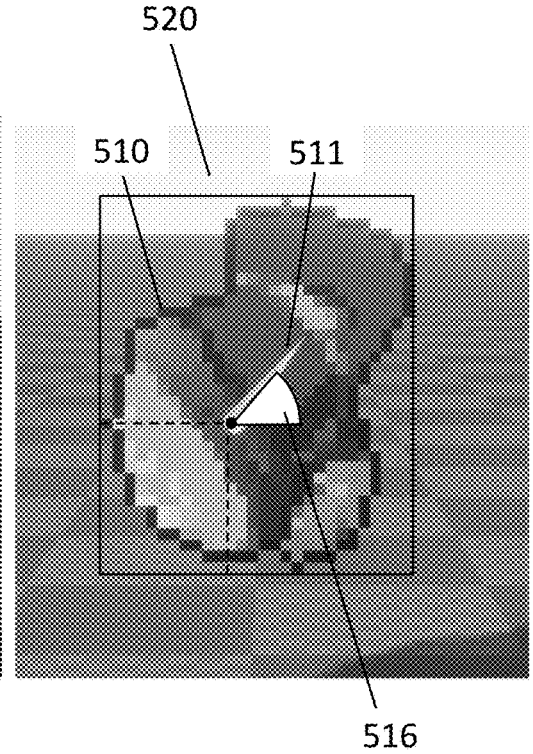

FIGS. 5A and 5B illustrate a 3D transformation structure mapping operation. In FIGS. 5A and 5B, two 2D source images 500 and 510 are each mapped to a 3D transformation structure 501 and 511 (which can be embodied as a "bone" in the images 500 and 510) that resides in a 3D space 520. The position offsets and rotational offset of the bone 501 and 511 are indicated.

In FIG. 5A, the 2D source image 500 can be mapped to the 3D transformation structure 501, which takes the form of a white bone in the current embodiment. In this embodiment, the bone 501 has a position in 3D space 520 given by X, Y, Z coordinates 502. In an embodiment, the position of the bone may be selected in the method when performing the 3D transformation structure mapping operation; alternatively, the position of the bone 501 may be chosen automatically by the software (e.g., without user input), based on attributes of the 2D source image 500 which indicate where the 3D transformation structure 501 should be placed. For example, the software may locate the center point of the 2D source image 500 and position the 3D transformation structure 501 at that location.

In FIG. 5A, a "bind position" from the position of the bone 501 and the position of the 2D source image 500 can be calculated, defined as the distance from the bone's 501 position to a predefined location on the 2D source image 500, or the fractional percentages of the 2D source image's 500 width and height which locate the bone 501 within the 2D image 500. In the embodiment shown in FIG. 5A, the predefined location on the 2D source image 500 is the image's bottom left corner, and the bind position is stored as a fractional percentages of the 2D source image's 500 width and height, given by an X component 503 and a Y component 504. The width and height of the 2D source image 500 are depicted visually by the square 505. The selection of the predefined location on the 2D source image 500 is arbitrary, and the bind position could be calculated relative to any point on the 2D source image 500 as long as that point is used consistently throughout the method. The bind position is used during the production operation to position the 2D source image 500 at the correct position relative to bone 501, if the bone 501 has changed position. In an alternative embodiment, the bind position may have a Z component in addition to the X and Y components. The Z component would offset the 2D source image 500 in 3D space 520 perpendicular to the plane of the 2D source image 500.

In FIG. 5A, a "bind rotation" from the rotation of the bone 501, defined as the rotation of the 3D transformation structure 501 relative to a predefined direction. In the embodiment shown in FIG. 5A, the predefined direction is a vector pointing to the right, and the bind rotation is given by rotation 506.

FIG. 5B illustrates another example of the same embodiment in which a 2D source image 510 is mapped to a bone 511, with bind rotation 516. In both FIGS. 5A and 5B, a single angle is sufficient to represent the bind rotation of the bone 501 and 511, because the bone's 501 and 511 rotation during the 3D transformation structure mapping operation is constrained to the XY plane (meaning that the tip of the bone can't point in a direction that is outside the XY plane). In an alternative embodiment, this restriction might not exist and the bone 501 and 511 could have any rotational value in 3D space 520. In this case, multiple angles or values would be used to represent the bind rotation of the bone 501 and 511. For example, three Euler angles representing the bone's 501 and 511 rotation about the X, Y, and Z axes, or a quaternion that represents the same 3D rotation.

Utility Data Collection Operation

An optional operation performed by the method is utility data collection. The utility data collection operation involves creating data structures that will be used in the calculations during the production operation. This utility data can be stored in any format, such as image files holding the data in their color channels (such as png or jpeg files), or structured or unstructured data files (such as xml or j son). Because the creation of these data structures is performance-intensive, the first embodiment of the disclosed method performs each operation once prior to beginning the production operation, and the utility data structures are stored for later use. An alternative embodiment may perform these operations during the production operation instead, leading to a less efficient production process but eliminating the need to save utility data structures for later use.

The utility data collection operation can be broken down into the following sub-operations: 1) an optional original image upscaling operation in which the original 2D image(s) is/are scaled up to a larger size to produce the 2D source image(s) that is/are used in the method; 2) an optional height map calculation operation in which third-dimension coordinates (e.g., a Z coordinate values) are calculated for all pixels in the 2D source image, and 3) an optional bone weight calculation operation, in which bone weights are calculated indicating each 3D transformation structure's effect on each pixel in a 2D source image. The utility data collection operation is optional because some embodiments contemplate that the method performs all sub-operations of the utility data collection operation; whereas, other embodiments contemplate that at least one of the sub-operations is not performed by the computer apparatus that implements the disclosed method, for example, 1) an upscaled image can be received as the 2D source image by the computer apparatus instead of the computer apparatus performing the original image upscaling operation, 2) a height map image can be received by the computer apparatus instead of the computer apparatus performing the height map calculation operation, 3) a bone weight image can be received by the computer apparatus instead of the computer apparatus performing the bone weight calculation operations, or 4) a combination of 1)-3).

Source Image Upscaling Operation

The source image upscaling operation can be used to scale an original 2D image up to a larger size to produce a 2D source image, prior to applying any transformations to the images. Use of this original image upscaling operation is optional. In some aspects, using the original image upscaling operation may provide better quality final 2D result images (also referred to as a 2D transformed image) in cases where the original 2D images are low-resolution (where low-resolution may be defined as, for example, an image smaller than 256×256 pixels in size), as is the case with "pixel art" images (e.g., small images with visible pixels used in some videogames and animations as a deliberate style choice.)

Figure 6A:
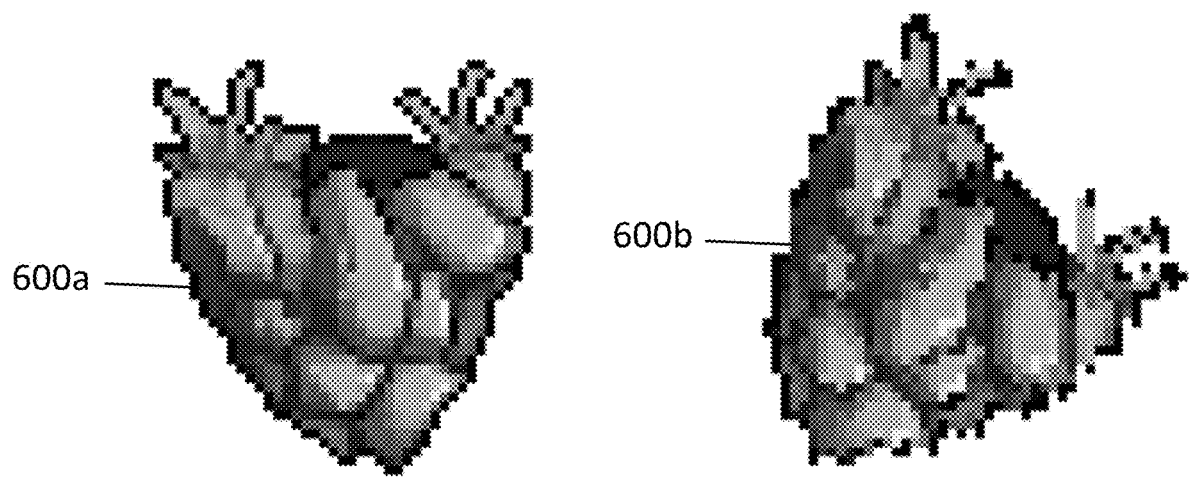
FIG. 6A illustrates the results of a 45-degree rotation applied to a low-resolution 2D image without image upscaling.
Figure 6B:
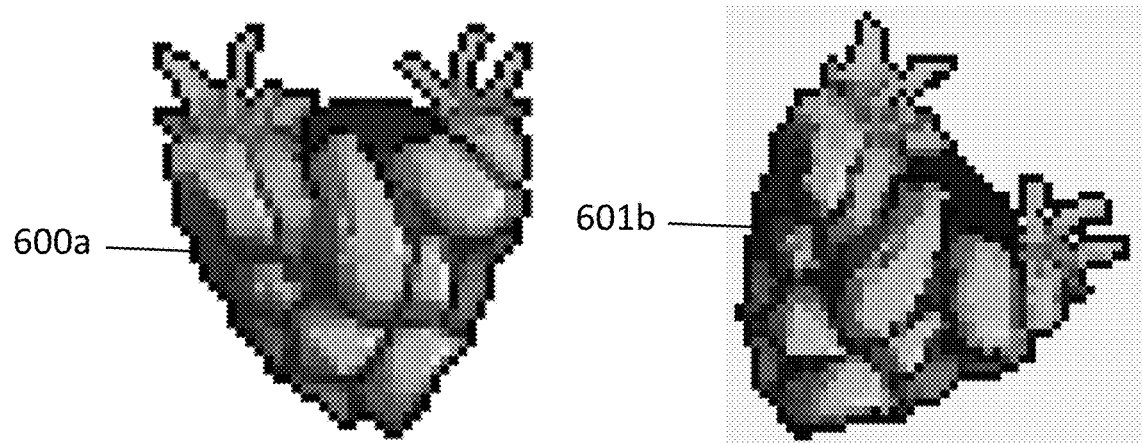
FIG. 6B illustrates the results of a 45-degree rotation applied to a 2D source image that resulted from first applying the image upscaling operation to a low-resolution 2D image.

FIG. 6A illustrates the results of a 45-degree rotation applied to a low-resolution 2D image 600a without image upscaling. The low-resolution 2D image 600a in FIG. 6A is the 2D source image for purposes of applying the transformation in the form of the 45-degree rotation. FIG. 6B illustrates the results of a 45-degree rotation applied to a 2D source image that resulted from first applying the image upscaling operation to the low-resolution 2D image 600a. Application of the transformation in FIG. 6A resulted in 2D transformed image 600b, and application of the transformation in FIG. 6B resulted in 2D transformed image 601b. The difference between the resulting 2D transformed images 600b and 601b is striking. 2D transformed image 600b, created without upscaling the original 2D image 600a (which is the 2D source image in FIG. 6A), exhibits poor retention of fine details and jagged edges around the object's silhouette. 2D transformed image 601b, created with upscaling the original 2D image 600a to produce the 2D source image that was then rotated 45 degrees, exhibits markedly better retention of fine details and a smoother outline. The transformations in FIGS. 6A and 6B are embodied as a rotation in the 2D plane; however, it is believed that the same differences would be achieved when rotating in 3 dimensions.

Figure 7:
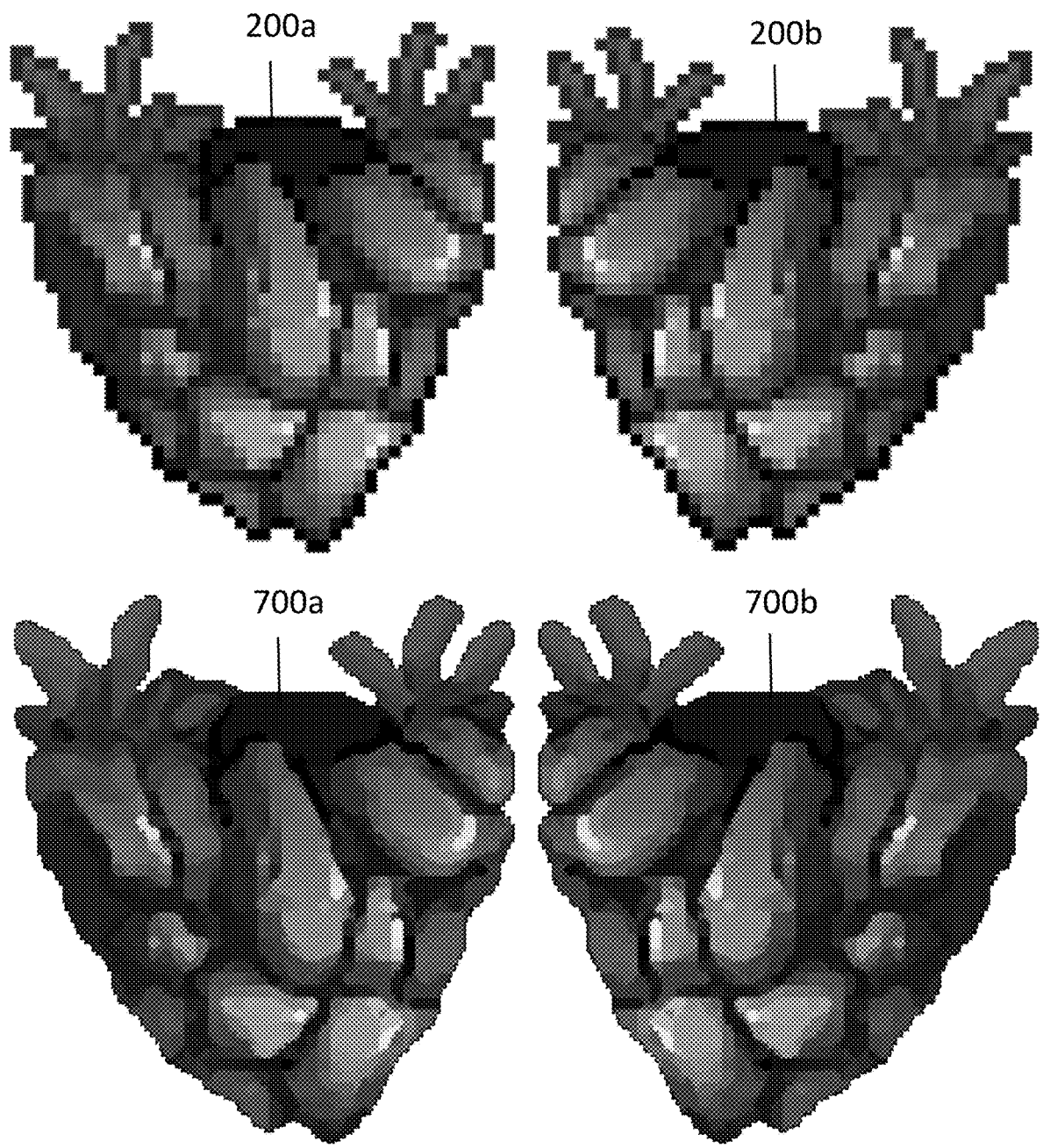
FIG. 7 illustrates two exemplary scaled-up images that were automatically generated from two original 2D images.

FIG. 7 illustrates two exemplary scaled-up images that can be automatically generated from two original 2D images according to the image upscaling operation. The original 2D images 200a and 200b from FIG. 2 (which are the 2D source images in FIG. 2) are shown for comparison. In FIG. 7, images 200a and 200b are referred to as original 2D images because the images are upscaled before being used as 2D source images in the disclosed method. Upscaling of the original 2D image(s) can be performed by any upscaling technique known in the art with the aid of this disclosure. In FIG. 7, the upscaled 2D images 700a and 700b are much higher resolution at 4 times the size of the original images, with size given in terms of the number of pixels in each image. In some embodiments, original 2D source images can be upscaled by a multiple of 2, 3, or 4 pixels in order to give the upscaled images a size of at least 128×128 pixels. In alternative embodiments, other multipliers and size limits may be used in the upscaling operation.

Height Map Calculation Operation

In some aspects, the method can include a height map calculation operation. The height map calculation operation is used to calculate third-dimension coordinates (e.g., Z coordinate values) for all pixels in a 2D source image. While the X and Y coordinates of each pixel are used to locate the pixel within the 2D source image, the Z coordinate of the pixel is used to describe the distance of the pixel from the surface of the image in a virtual 3D space, giving the pixel a "virtual height". Using this virtual height, each 2D pixel position in the 2D source image can be converted into a "virtual 3D position" during the production operation (discussed in more detail below).

Figure 8:
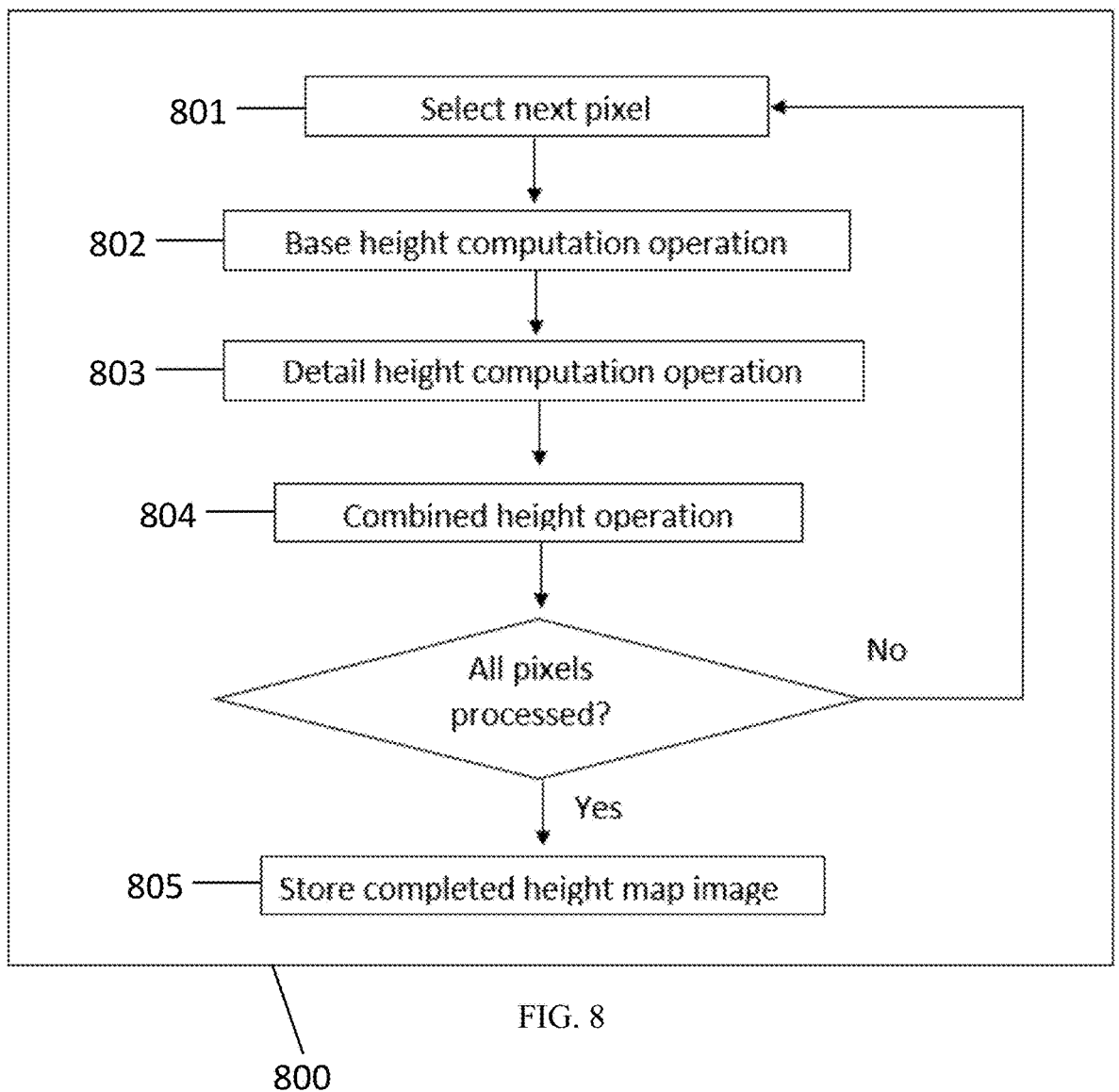
FIG. 8 illustrates a flowchart of a height map calculation operation.

FIG. 8 illustrates a flowchart of a height map calculation operation 800. The height map calculation operation 800 begins at block 801, where a pixel in a 2D source image (e.g., an upscaled 2D image or an original 2D image that is not upscaled) is selected. In block 802, a base height computation operation is performed, wherein a base height is calculated for the selected pixel in the 2D source image. The base height of the pixel can be calculated as a function of a location of the pixel in the 2D source image (e.g., pixels further from the silhouette of the 2D source image can have a larger base height). In block 803, a detail height computation operation is performed, wherein a detail height is calculated for the selected pixel. The detail height can be calculated as a function of a color of the selected pixel (e.g., pixels with a lighter color are likely exposed to more light than darker pixels, and therefore have a greater detail height). In block 804, a combined height operation is performed, wherein the base height for the selected pixel that is calculated in block 802 and the detail height for the selected pixel that is calculated in block 803 are combined to produce a combined height for the selected pixel. This process flow of the height map calculation operation 800 in blocks 801, 802, 803, and 804 is repeated for all remaining pixels in the 2D source image. After determining that all pixels in the 2D source image have been processed in through blocks 801, 802, 803, and 804, the height map calculation operation 800 then proceeds to block 805. In block 805, a height map image is produced, stored into a database or datastore, or produced and stored. In aspects, the height map image can be the same size as the 2D source image (e.g., the upscaled image or the image that was processed but not upscaled). In some aspects, each pixel in the height map image has a value in the range of from 0 (black) to 1 (white), representing the height of the pixel. Pixels with a higher value (closer to 1) appear raised further from the surface of the 2D source image than pixels with a lower value (closer to 0).

Figure 9:
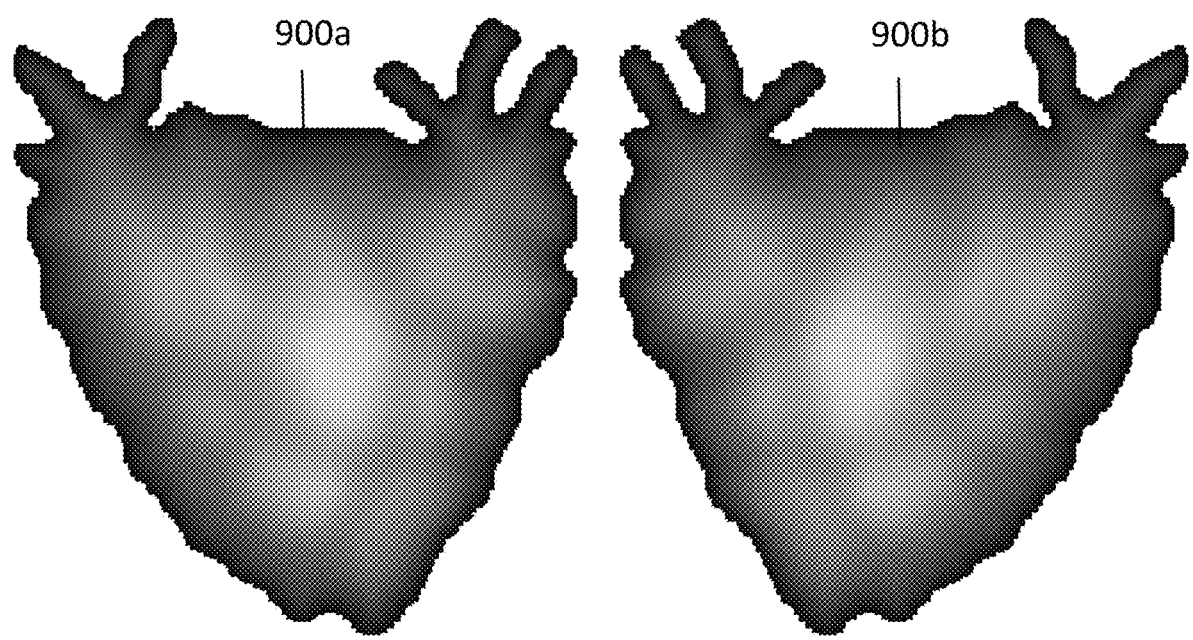
FIG. 9 illustrates two height maps generated for the 2D source images of FIG. 2 by the height map calculation operation.

FIG. 9 illustrates two height maps generated by the height map calculation operation 800. Height map image 900a was generated for the front side of an object, and height map image 900b was generated for the back side of the same object. The height map image 900a was produced by performing the height map calculation operation 800 on 2D source image 700a (which is an upscaled image). The height map image 900b was produced by performing the height map calculation operation 800 on 2D source image 700b (which is an upscaled image). The pixels that appear lighter in color have pixel height values closer to 1 than the darker-appearing, and pixels that appear darker in color have pixel height values closer to 0 than the lighter-appearing pixels. For the height map images 900a and 900b in FIG. 9, the shading of pixels indicates that regions in the middle of the images 900a and 900b are greater in height than pixels located on the periphery of the images 900a and 900b, in general.

In some embodiments the computer(s) that performs the other aspects of the disclosed method can perform the height map calculation operation 800. In an alternative embodiment, the height map calculation operation 800 can be performed by an artist or animation creator and passed into the program on the computer that executes the disclosed method. In such embodiments, the method can include receiving a height map image from the artist or animation creator via another computer.

Bone Weight Calculation Operation

The method can also include a bone weight calculation operation. The bone weight calculation operation is used to calculate weighting values which represent the effect of each 3D transformation structure on each pixel in a 2D source image. The bone weight calculation operation may be used in embodiments where there are multiple distinct 3D transformation structures ("bones") bound to a single 2D source image, in order to allow a blending of the 3D transforms that are applied to each 3D transformation structure. We use the terms "bone weight" and "bone weight image" in the section that follows because the terms are easy to understand, but it should be understood that the principles given in this section could be applied for any type of 3D transformation structure and not only for those 3D transformation structures represented by a visual bone.

Figure 10:
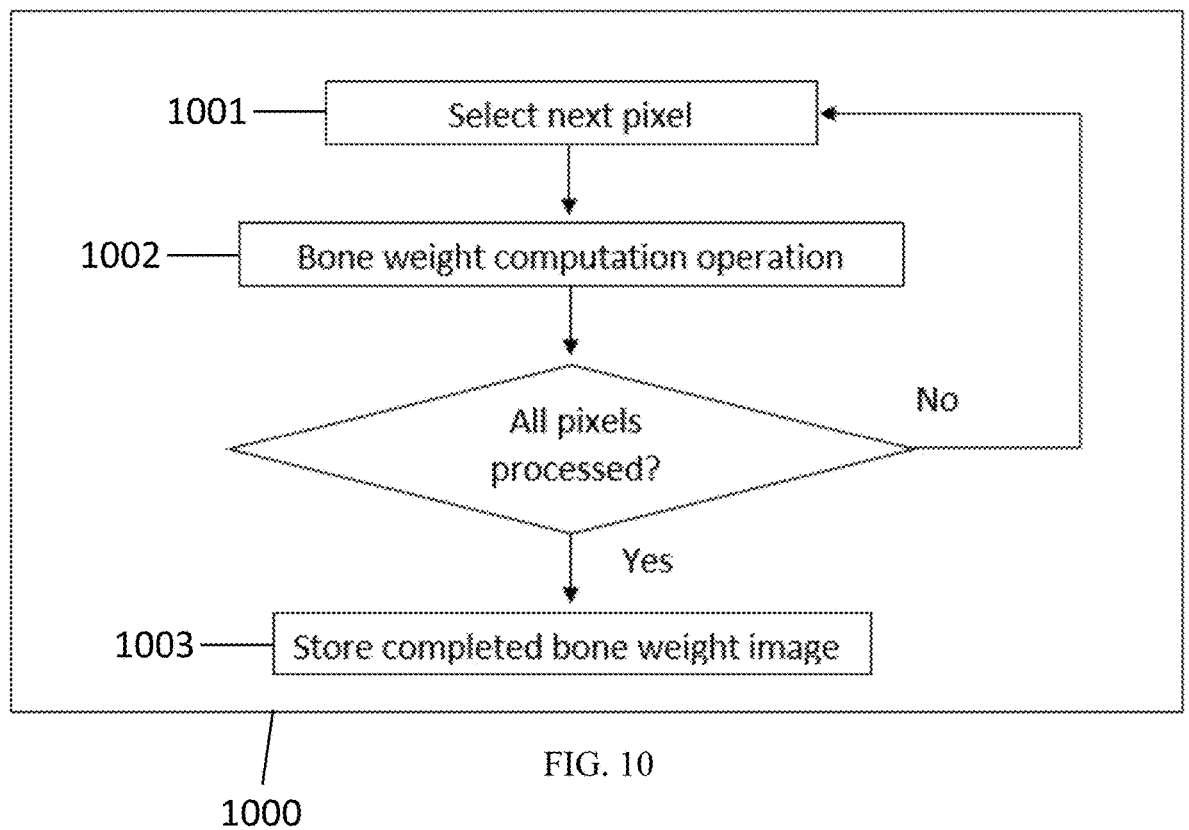
FIG. 10 illustrates a flowchart of a bone weight calculation operation.

FIG. 10 illustrates a flowchart of a bone weight calculation operation 1000. The bone weight calculation operation 1000 begins at block 1001. In block 1001, a pixel from the 2D source image is selected. In block 1002, a bone weight computation operation can be performed, wherein a bone weight is computed for the selected pixel from the 2D source image. The bone weight can be computed as a function of the proximity of the selected pixel to the bone(s) in the 2D source image; additionally or alternatively, the bone weight can be computed by any other criteria which would indicate the influence that a 3D transformation structure (bone) should have on the selected pixel's transformation. For a 2D source image that has one bone, a single weighting value is calculated for a given pixel is with respect to the one bone, and the weighting value represents the effect of the one bone on the given pixel. For a 2D source image that has more than one bone (i.e., multiple bones), multiple weighting values are calculated for a given pixel, with one weighting value corresponding to each of the multiple bones, and each weighting value represents the effect of its corresponding bone on the given pixel. The bone weight for a given pixel can thus be defined as the plurality of weighting values collected for that pixel, with one weighting value for each bone. This process flow of the bone weight calculation operation 1000 in blocks 1001 and 1002 is repeated for all remaining pixels in the 2D source image. After determining that all pixels in the 2D source image have been processed in blocks 1001 and 1002, the bone weight calculation operation 1000 then proceeds to block 1003. In block 1003, a bone weight image is produced, stored into a database or datastore, or produced and stored. In aspects, the bone weight image can be the same size as the 2D source image (e.g., the upscaled image or the image that was processed but not upscaled). In some aspects, each pixel in the bone weight image has a value that stores a single bone weighting value in each of its color channels Red, Blue, Green, and Alpha. In this aspect a 2D source image may have four bones, and the weighting value for each bone is stored in one of the color channels. In this aspect, it is most practical for the sum of the weighting values to be consistent for all pixels (e.g., for all pixels in the bone weight image, the sum of the weighting values stored in each color channels may always be 255, assuming that it is an 8-bit color, where there are $2^8$=256 possible values in each color channel.)

In some embodiments the computer(s) that performs the other aspects of the disclosed method can perform the bone weight calculation operation 1000. In an alternative embodiment, the bone weight calculation operation 1000 can be performed by an artist or animation creator and passed into the program on the computer that executes the disclosed method. In such embodiments, the method can include receiving a bone weight image from the artist or animation creator via another computer.

FIG. 11A illustrates two bones 1100a and 1100b mapped to a 2D source image 1101. FIG. 11B illustrates a bone weight image 1103 that was produced by performing the bone weight calculation operation 1000 in FIG. 10 on the 2D source image 1101. Each pixel in the bone weight image 1103 holds a color value representing the bone weights of the respective pixel. Each color channel (red, green, blue, and alpha) holds a value from 0 to 255 (assuming that it is an 8-bit color, where there are $2^8$=256 possible values in each color channel) representing the influence that a single distinct bone has over the pixel's transformation. Points 1102a and 1102b represent the locations on the bone weight image 1103 that are endpoints (e.g., base 1102b and top 1102a) of bone 1100a. Points 1102c and 1102d represent the locations on the bone weight image 1103 that are the endpoints (e.g., base 1102d and tip 1102c) of bone 1100b. It can be seen that the colors of the pixels in the bone weight image 1103 are influenced by their proximity to each of the points 1102a, 1102b, 1102c, and 1102d.

FIG. 12A illustrates a 2D source image 1200 that was mapped to two 3D transformation structures 1251 and 1252 (or bones 1251 and 1252). The object portrayed in the 2D source image 1200 can be seen relative to a three-coordinate system X, Y, and Z. Each of the transformation structures 1251 and 1252 has a distinct position (given by an X, Y, and Z coordinate) and rotation (given by a direction in 3D space).

FIG. 12B illustrates the effect of the bone weight operation 1000 in FIG. 10 on a 2D transformed image 1201 that was produced from the 2D source image 1200 of FIG. 12A. In FIG. 12B, it can be seen that after transformation, one of the distinct 3D transformation structures 1252 remains stationary, while a 3D transformation is applied to the other distinct bone 1251. The result is a bending effect of the object in the 2D transformed image 1201, wherein some of the pixels are influenced more heavily by the transformation of bone 1251 than others.

Production Operation

Figure 13:
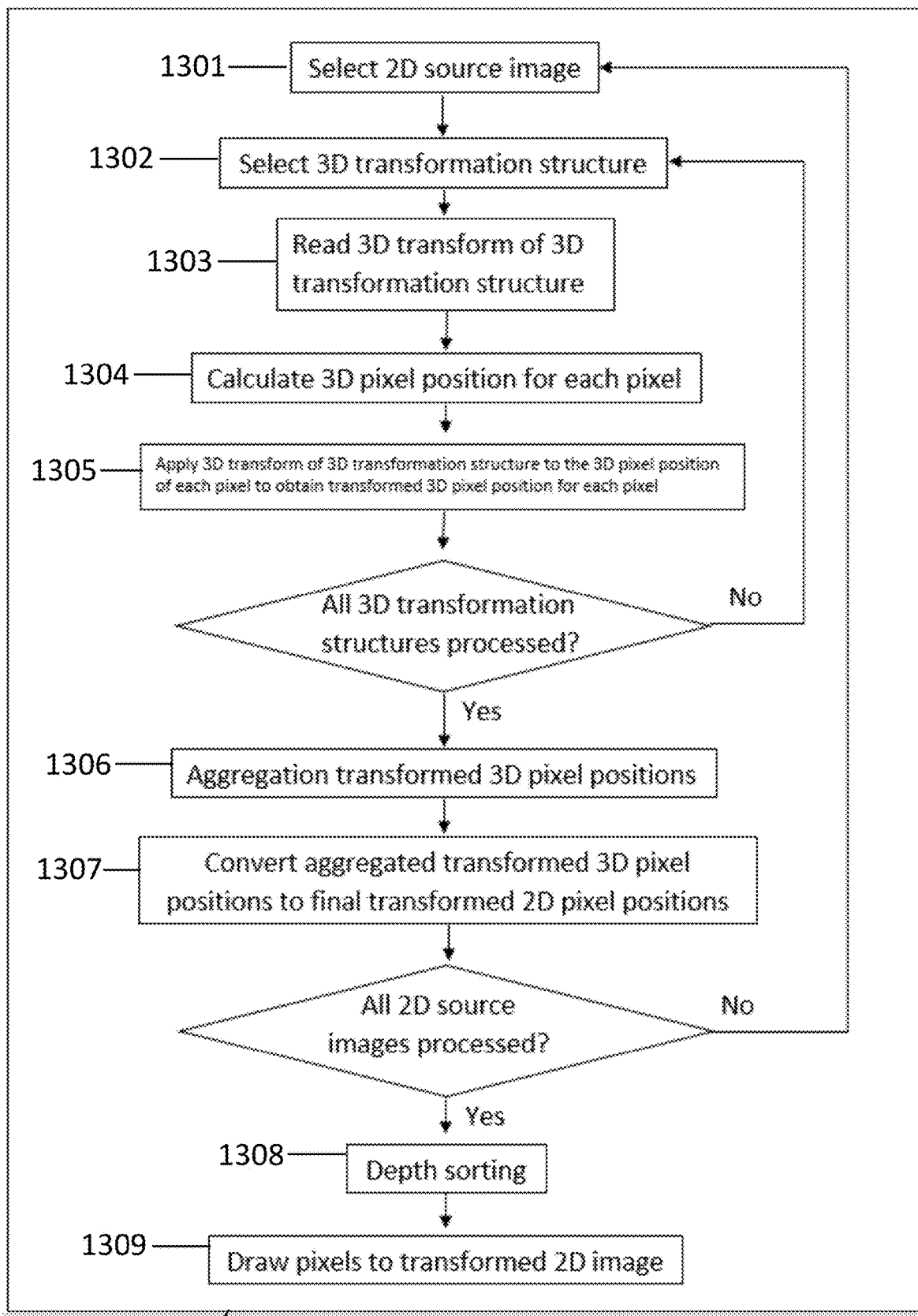
FIG. 13 illustrates a flowchart of a production operation.

FIG. 13 illustrates a flowchart of a production operation 1300. The production operation 1300 begins at block 1301. In block 1301, a 2D source image is selected (or otherwise recognized, read, or prepared for processing in subsequent steps). The 2D source image can be any embodiment described herein, such as a 2D source image that has previously been upscaled from an original 2D image, or as an original 2D image that has not been upscaled. In block 1302, a 3D transformation structure for the 2D source image is selected (or otherwise recognized, read, or prepared for processing in subsequent steps). In block 1303, the 3D transform is read (or otherwise determined) for the selected 3D transformation structure. In one embodiment, the 3D transform is determined based on the movement and rotation of a bone in 3D space (e.g., the bone's transform may be represented as a rotation matrix which represents the position and rotation of the bone, or by the combination of a quaternion which represents the rotation of the bone and a vector composed of an X, Y, and Z coordinate which represents the position of the bone). In block 1304, the 2D pixel position (x1, y1) of each pixel in the 2D source image is converted into a 3D pixel position in 3D space (x1, y1, z1), where z1 is calculated using the height map image (e.g., by multiplying the value of a given pixel in the height map 900a of FIG. 9 by a constant in order to obtain the value z1 for that given pixel). In block 1305, the 3D transform of the 3D transformation structure of the 2D source image is applied to each 3D pixel position (x1, y1, z1) in order to obtain a transformed 3D pixel position (x2, y2, z2) (e.g., a rotation matrix is multiplied by the 3D pixel position in order to obtain a transformed 3D position.)

The production operation 1300 then determines whether all 3D transformation structures for the selected 2D source image have been processed in the production operation 1300. If no, then the production operation 1300 returns to block 1302, where the next 3D transformation structure is selected. The production operation then proceeds through blocks 1303, 1304 and 1305 for the selected next 3D transformation structure, as described for the first 3D transformation structure. If yes, once all 3D transformation structures have been processed for the selected 2D source image, the production operation 1300 then proceeds to block 1306.

In block 1306, the transformed 3D pixel positions for all the pixels are aggregated using the bone weights calculated during the bone weight calculation operation 1000. For example, the transformed 3D pixel positions are aggregated by multiplying each transformed 3D pixel position by a weighting value between 0 and 1 for its corresponding 3D transformation structure, then summing the results. It should be noted that in embodiments that do not utilize a bone weight calculation operation (for example, if there is only a single 3D transformation structure mapped to a 2D source image), the 3D position aggregation operation in block 1306 may be omitted. In block 1307, the aggregated 3D pixel positions are converted back to into 2D positions, yielding the final transformed 2D pixel position for each pixel, and the Z coordinate of the 3D pixel position for each pixel is retained as the pixel's "depth".

The production operation 1300 then determines whether all 2D source images have been processed in the production operation 1300. If no, the operation 1300 returns to block 1301, where the next 2D source image is selected. The production operation 1300 then proceeds through blocks 1302, 1303, 1304, 1305, 1306, and 1307 for the selected next 2D source image, as described above for the first selected 2D source image. If yes, and once all 2D source images are processed in the production operation 1300 as hereabove described, the production operation 1300 proceeds to block 1308.

In block 1308, the production operation 1300 can perform a depth sorting operation, in order to determine which pixels should be drawn to the transformed 2D image, using the depths calculated in block 1307. For example, pixels with a higher depth value may be considered further away and will not be drawn if another pixel is placed in the same 2D coordinate location but with a lower depth value. The production operation 1300 then proceeds to block 1309. In block 1309, the pixels are drawn to (rendered to, made part of, added to) the transformed 2D image using the final transformed 2D pixel positions obtained in block 1307 and the depth sorting priority generated in block 1308, which may be rendered immediately to the display screen of a computer apparatus running the method and/or saved on the computer apparatus or another database or datastore as a 2D raster-art image.

Interface for Generating Rotated Animation Sequences and Images

Figure 14:
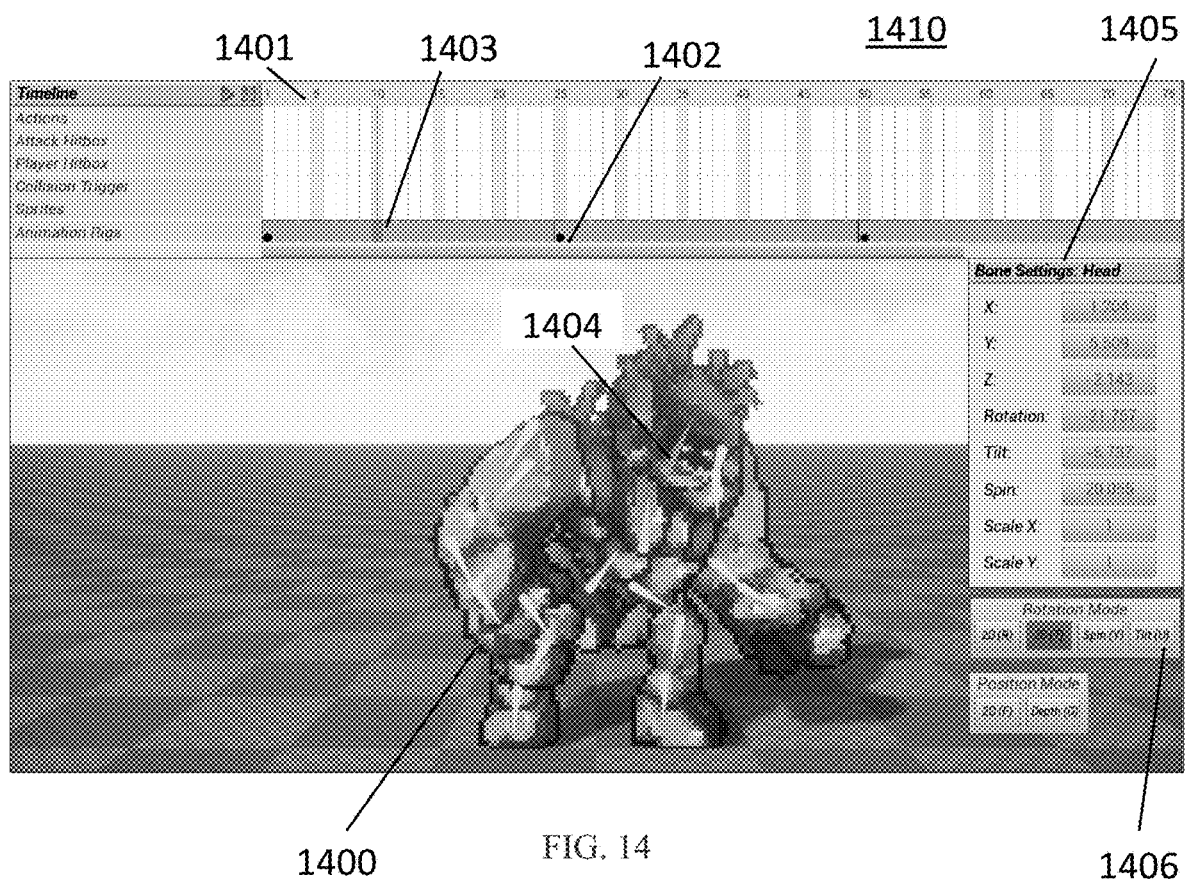
FIG. 14 illustrates a user interface for a computer apparatus configured to generate rotated views of a collection of 2D source images.

FIG. 14 illustrates a user interface 1410 that can be displayed on a display of a computer apparatus that is configured to perform an embodiment of the method disclosed herein, for example, to generate a rotated animation sequence and images for a collection of 2D source images. The user interface 1410 resembles the user interface of a traditional 3D animation computer program, and enables a user to assemble an animation rig 1400 composed of one or multiple 2D source images and 3D transformation structures as represented by bones, such as bone 1404. Unlike a traditional 3D animation program, no 3D models are present or used. Instead, the 2D source images in the animation rig 1400 are redrawn each frame based on the transformations of the bones in 3D space.

FIG. 14 includes a timeline pane 1401 that shows each frame in the animation, where each frame represents an instant in time. The user can add keyframes such as keyframe 1402, where the bones (e.g., bone 1404) on each keyframe (e.g., keyframe 1402) contain a 3D pose set by the user. The currently selected keyframe 1403 may be between multiple keyframes, in which case the program performs interpolation between the 3D transforms of the bones stored on the keyframes before rendering the 2D transformed images in the animation rig 1400.

If the user selects a bone (e.g., bone 1404), for example by clicking on the bone 1404 via the user interface 1410 with a mouse, properties of the bone's 1404 current 3D transform are displayed in a bone settings pane 1405 and can be edited by the user. Various transformation mode options can also be displayed in a transformation mode pane 1406. If the user selects a transformation mode, they can click a bone using the mouse or other selection method, then perform a transformation operation on the bone through direct manipulation (for example, by dragging the mouse).

Figure 15:
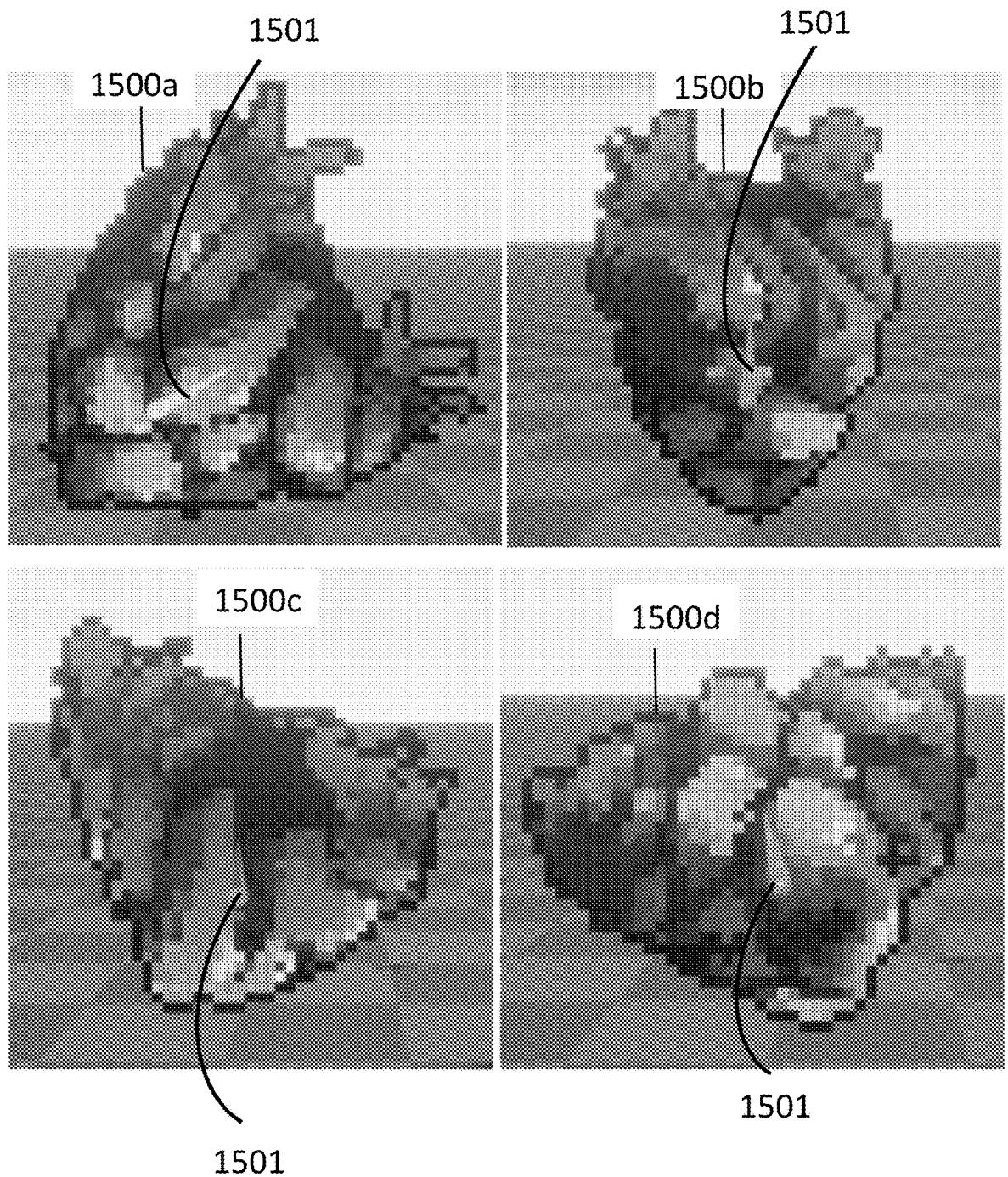
FIG. 15 illustrates 2D transformed images produced by the production operation in FIG. 13 from the 2D source image of FIG. 2 via the user interface 1400.

FIG. 15 illustrates 2D transformed images 1500a, 1500b, 1500c, and 1500d produced from the 2D source image 200a of FIG. 2 via the user interface 1400 of FIG. 14. The 2D transformed images 1500a, 1500b, 1500c, and 1500d were produced according to the production operation 1300 in FIG. 13 for the 2D source image 200a of FIG. 2 mapped to a single 3D transformation structure (shown as bone 1501 in FIG. 15).

FIG. 16 illustrates 3D transformations applied to an entire animation rig. The bones in the animation rig have been arranged into a variety of 3D poses 1600a, 1600b, 1600c, 1600d, 1600e, and 1600f, and in each case the 2D source images are redrawn to match the pose. Each of the character's body parts (e.g., the head, torso, right arm, right forearm, etc.) is created using two 2D source images (a front side image and a back side image), consistent with the setup shown in 100a, 100b, 100c, and 100d of FIG. 1. Each 2D source image is mapped to a single bone. The production operation 1300 of FIG. 13 is performed on the entire collection of 2D source images, and the operations 1302, 1303, 1304, 1305, 1306, and 1307 of FIG. 13 performed for each 2D source image yield a transformed 2D image. The depths of the pixels in the transformed 2D images are sorted via operation 1308 of FIG. 13 in order to determine which pixels should be drawn to the final 2D texture (e.g., pixels with a larger depth are further away from the camera and may not be drawn if another pixel occupies the same 2D position but has a lower depth), and the final pixels are drawn to the transformed 2D image via operation 1309 of FIG. 13.

It is contemplated that the method can be implemented on a computer apparatus having multiple modules or processes or programs that collectively implement one or more of the functions disclosed herein.

Additional Description

The following is an additional description of embodiments the disclosed method, computer apparatus, and computer program.

Embodiment 1 is a computer implemented method comprising one or more of: selecting a two-dimensional (2D) source image (e.g., a 2D raster-art source image); selecting a first three-dimensional (3D) transformation structure in the selected 2D source image; reading a three-dimensional (3D) transform of the first 3D transformation structure; calculating a first three-dimensional (3D) pixel position for a first pixel in the 2D source image; applying the 3D transform of the first 3D transformation structure to the first 3D pixel position; converting the first 3D pixel position to a first transformed two-dimensional (2D) pixel position; and drawing the first pixel to a transformed two-dimensional (2D) image, wherein the first pixel has the first transformed 2D pixel position in the transformed 2D image.

Embodiment 2 is the method of Embodiment 1, further comprising one or more of: calculating a second 3D pixel position for the first pixel in the 2D source image; selecting a second three-dimensional (3D) transformation structure in the selected 2D source image; reading a three-dimensional (3D) transform of the second 3D transformation structure; applying the 3D transform of the second 3D transformation structure to the second 3D pixel position; aggregating the first 3D pixel position and the second 3D pixel position in order to obtain an aggregated three-dimensional (3D) pixel position; converting the aggregated 3D pixel position to an aggregated transformed two-dimensional (2D) pixel position; wherein after the step of drawing the first pixel has the aggregated transformed 2D pixel position in the transformed 2D image.

Embodiment 3 is the method of Embodiment 2, further comprising: performing a bone weight calculation operation for the first pixel and the first 3D transformation structure to produce a first bone weight; and performing the bone weight calculation operation for the first pixel and the second 3D transformation structure to produce a second bone weight; wherein the first 3D pixel position and the second 3D pixel position are aggregated based on the first bone weight and the second bone weight.

Embodiment 4 is the method of any of Embodiments 1 to 3, further comprising one or more of: calculating a second 3D pixel position for a second pixel in the 2D source image; applying the first 3D transform of the 3D transformation structure to the second 3D pixel position; converting the second 3D pixel position to a second transformed 2D pixel position; drawing the second pixel to the transformed two-dimensional (2D) image, wherein the second pixel has the second transformed 2D pixel position in the transformed 2D image; and depth sorting the first pixel and the second pixel after converting the first 3D pixel position to the first transformed 2D pixel position and after converting the second 3D pixel position to the second transformed 2D pixel position.

Embodiment 5 is the method of any of Embodiments 1 to 4, further comprising: upscaling an original two-dimensional (2D) image to produce the 2D source image.

Embodiment 7 is the method of any of Embodiments 1 to 6, further comprising: performing a height map calculation operation on the 2D source image to produce a height map image, wherein a third-dimension coordinate of the first 3D pixel position of the first pixel is calculated based on the height map image.

Embodiment 8 is the method of any of Embodiments 1 to 7, wherein the 2D source image is a raster-art image.

Embodiment 9 is the method of any of Embodiments 1 to 8, further comprising: mapping the 2D source image to the 3D transformation structure.

Embodiment 10 is a computer apparatus comprising one or more processors, a memory, and instructions stored in the memory that when executed by the one or more processors cause the one or more processors to perform one or more of: select a two-dimensional (2D) source image (e.g., a 2D raster-art source image); select a three-dimensional (3D) transformation structure in the selected 2D source image; read a three-dimensional (3D) transform of the 3D transformation structure; calculate a first three-dimensional (3D) pixel position for a first pixel in the 2D source image; apply the 3D transform of the 3D transformation structure to the first 3D pixel position; convert the first 3D pixel position to a first transformed two-dimensional (2D) pixel position; and draw the first pixel to a transformed two-dimensional (2D) image, wherein the first pixel has the first transformed 2D pixel position in the transformed 2D image.

Embodiment 11 is the computer apparatus of Embodiment 10, wherein when executed by the one or more processors the instructions cause the one or more processors further to perform one or more of: calculate a second 3D pixel position for the first pixel in the 2D source image; selecting a second three-dimensional (3D) transformation structure in the selected 2D source image; read a three-dimensional (3D) transform of the second 3D transformation structure; apply the 3D transform of the second 3D transformation structure to the second 3D pixel position; aggregate the first 3D pixel position and the second 3D pixel position in order to obtain an aggregated three-dimensional (3D) pixel position; convert the aggregated 3D pixel position to an aggregated transformed two-dimensional (2D) pixel position; and draw the first pixel to a transformed two-dimensional (2D) image, wherein the first pixel has the aggregated transformed 2D pixel position in the transformed 2D image.

Embodiment 12 is the computer apparatus of Embodiment 11, wherein when executed by the one or more processors the instructions cause the one or more processors further to: perform a bone weight calculation operation for the first pixel and the first 3D transformation structure to produce a first bone weight; and perform the bone weight calculation operation for the first pixel and the second 3D transformation structure to produce a second bone weight; wherein the first 3D pixel position and the second 3D pixel position are aggregated based on the first bone weight and the second bone weight.

Embodiment 13 is the computer apparatus of Embodiment 10, 11, or 12, wherein when executed by the one or more processors the instructions cause the one or more processors further to: calculate a second 3D pixel position for a second pixel in the 2D source image; apply the first 3D transform of the 3D transformation structure to the second 3D pixel position; converting the second 3D pixel position to a second transformed 2D pixel position; draw the second pixel to the transformed two-dimensional (2D) image, wherein the second pixel has the second transformed 2D pixel position in the transformed 2D image; and depth sort the first pixel and the second pixel after converting the first 3D pixel position to the first transformed 2D pixel position and after converting the second 3D pixel position to the second transformed 2D pixel position.

Embodiment 14 is the computer apparatus of any of Embodiments 10 to 13, wherein when executed by the one or more processors the instructions cause the one or more processors further to: upscale an original two-dimensional (2D) image to produce the 2D source image.

Embodiment 15 is the computer apparatus of any of Embodiments 10 to 14, wherein when executed by the one or more processors the instructions cause the one or more processors further to: perform a height map calculation operation on the 2D source image to produce a height map image, wherein a third-dimension coordinate of the first 3D pixel position of the first pixel is calculated based on the height map image.

Embodiment 16 is the computer apparatus of any of Embodiments 10 to 15, wherein when executed by the one or more processors the instructions cause the one or more processors further to: map the 2D source image to the 3D transformation structure.

Embodiment 17 is a computer program comprising executable instructions stored in a non-transitory computer readable medium that when executed by a processor causes the processor to perform one or more of: select a two-dimensional (2D) source image (e.g., a 2D raster-art source image); select a three-dimensional (3D) transformation structure in the selected 2D source image; read a three-dimensional (3D) transform of the 3D transformation structure; calculate a first three-dimensional (3D) pixel position for a first pixel in the 2D source image; apply the 3D transform of the 3D transformation structure to the first 3D pixel position; convert the first 3D pixel position to a first transformed two-dimensional (2D) pixel position; and draw the first pixel to a transformed two-dimensional (2D) image, wherein the first pixel has the first transformed 2D pixel position in the transformed 2D image.

Embodiment 18 is the computer program of Embodiment 17, wherein when executed by the one or more processors the instructions cause the one or more processors further to perform one or more of: calculate a second 3D pixel position for the first pixel in the 2D source image; selecting a second three-dimensional (3D) transformation structure in the selected 2D source image; read a three-dimensional (3D) transform of the second 3D transformation structure; apply the 3D transform of the second 3D transformation structure to the second 3D pixel position; aggregate the first 3D pixel position and the second 3D pixel position in order to obtain an aggregated three-dimensional (3D) pixel position; convert the aggregated 3D pixel position to an aggregated transformed two-dimensional (2D) pixel position; and draw the first pixel to a transformed two-dimensional (2D) image, wherein the first pixel has the aggregated transformed 2D pixel position in the transformed 2D image.

Embodiment 19 is the computer program of Embodiment 18, wherein when executed by the one or more processors the instructions cause the one or more processors further to perform one or more of: perform a bone weight calculation operation for the first pixel and the first 3D transformation structure to produce a first bone weight; and perform the bone weight calculation operation for the first pixel and the second 3D transformation structure to produce a second bone weight; wherein the first 3D pixel position and the second 3D pixel position are aggregated based on the first bone weight and the second bone weight.

Embodiment 20 is the computer program of any of Embodiments 17 to 19, wherein when executed by the one or more processors the instructions cause the one or more processors further to perform one or more of: calculate a second 3D pixel position for a second pixel in the 2D source image; apply the first 3D transform of the 3D transformation structure to the second 3D pixel position; converting the second 3D pixel position to a second transformed 2D pixel position; draw the second pixel to the transformed two-dimensional (2D) image, wherein the second pixel has the second transformed 2D pixel position in the transformed 2D image; and depth sort the first pixel and the second pixel after converting the first 3D pixel position to the first transformed 2D pixel position and after converting the second 3D pixel position to the second transformed 2D pixel position.

Embodiment 21 is the computer program of any of Embodiments 17 to 20, wherein when executed by the one or more processors the instructions cause the one or more processors further to: perform a height map calculation operation on the 2D source image to produce a height map image, wherein a third-dimension coordinate of the first 3D pixel position of the first pixel is calculated based on the height map image.

Embodiment 22 is the computer program of any of Embodiments 17 to 21, wherein when executed by the one or more processors the instructions cause the one or more processors further to: map the 2D source image to the 3D transformation structure.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    selecting a two-dimensional (2D) raster-art source image;
    selecting a first three-dimensional (3D) structure;
    reading first 3D rotation offsets which describe a desired orientation of the first 3D structure relative to an initial orientation of the first 3D structure;
    obtaining a first cartesian coordinate formed by concatenating a first 2D pixel position in the 2D source image and a first depth value;
    applying the first 3D rotation offsets to the first cartesian coordinate in order to obtain a first transformed cartesian coordinate;
    separating the first transformed cartesian coordinate into a first transformed two-dimensional (2D) pixel position and a first transformed depth value; and
    drawing a first pixel to a transformed two-dimensional (2D) image, wherein the first pixel has the first transformed 2D pixel position in the transformed 2D image, wherein the transformed 2D image is generated in a coordinate space without use of a 3D model.

2. The method of claim 1, further comprising:
    selecting a second three-dimensional (3D) structure in the selected 2D source image;
    reading second 3D rotation offsets which describe a second desired orientation of the second 3D structure relative to a second initial orientation of the second 3D structure;
    applying the second 3D rotation offsets to the first cartesian coordinate in order to obtain a second transformed cartesian coordinate;
    aggregating the first transformed cartesian coordinate and the second transformed cartesian coordinate in order to obtain an aggregated transformed cartesian coordinate;
    converting the aggregated transformed cartesian coordinate to an aggregated transformed two-dimensional (2D) pixel position and an aggregated transformed depth value; and
    drawing the first pixel to a transformed two-dimensional (2D) image, wherein the first pixel has the aggregated transformed 2D pixel position in the transformed 2D image.

3. The method of claim 2, further comprising:
    performing a bone weight calculation operation for the first pixel and the first 3D structure to produce a first bone weight; and
    performing the bone weight calculation operation for the first pixel and the second 3D structure to produce a second bone weight;
    wherein the first transformed cartesian coordinate and the second transformed cartesian coordinate are aggregated based on the first bone weight and the second bone weight.

4. The method of claim 1, further comprising:
    obtaining a second cartesian coordinate formed by concatenating a second 2D pixel position in the 2D source image and a second depth value;
    applying the first 3D rotation offsets to the second cartesian coordinate in order to obtain a second transformed cartesian coordinate;

separating the second transformed cartesian coordinate
into a second transformed two-dimensional (2D) pixel
position and a second transformed depth value;
drawing a second pixel to the transformed two-dimensional (2D) image, wherein the second pixel has the second transformed 2D pixel position in the transformed 2D image; and
depth sorting the first pixel and the second pixel after separating the first transformed cartesian coordinate and after separating the second transformed cartesian coordinate.

5. The method of claim 1, further comprising:
upscaling an original two-dimensional (2D) image to produce the 2D source image.

6. The method of claim 1, further comprising:
performing a height map calculation operation on the 2D source image to produce a height map image, wherein the first depth value of the first cartesian coordinate of the first pixel is calculated based on the height map image.

7. The method of claim 1, further comprising:
mapping the 2D source image to the first 3D structure.

8. A computer apparatus comprising:
one or more processors;
a memory; and
instructions stored in the memory that when executed by the one or more processors cause the one or more processors to:
select a two-dimensional (2D) raster-art source image;
select a first three-dimensional (3D) structure;
read first 3D rotation offsets which describe a desired orientation of the first 3D structure relative to an initial orientation of the first 3D structure;
obtain a first cartesian coordinate formed by concatenating a first 2D pixel position in the 2D source image and a first depth value;
apply the first 3D rotation offsets to the first cartesian coordinate in order to obtain a first transformed cartesian coordinate;
separate the first transformed cartesian coordinate into a first transformed two-dimensional (2D) pixel position and a first transformed depth value; and
draw a first pixel to a transformed two-dimensional (2D) image, wherein the first pixel has the first transformed 2D pixel position in the transformed 2D image, wherein the transformed 2D image is generated in a coordinate space without use of a 3D model.

9. The computer apparatus of claim 8, wherein when executed by the one or more processors the instructions cause the one or more processors further to:
select a second three-dimensional (3D) structure in the selected 2D source image;
read second 3D rotation offsets which describe a second desired orientation of the second 3D structure relative to a second initial orientation of the second 3D structure;
apply the second 3D rotation offsets to the first cartesian coordinate in order to obtain a second transformed cartesian coordinate;
aggregate the first transformed cartesian coordinate and the second transformed cartesian coordinate in order to obtain an aggregated transformed cartesian coordinate;
convert the aggregated transformed cartesian coordinate to an aggregated transformed two-dimensional (2D) pixel position and an aggregated transformed depth value; and
draw the first pixel to a transformed two-dimensional (2D) image, wherein the first pixel has the aggregated transformed 2D pixel position in the transformed 2D image.

10. The computer apparatus of claim 9, wherein when executed by the one or more processors the instructions cause the one or more processors further to:
perform a bone weight calculation operation for the first pixel and the first 3D structure to produce a first bone weight; and
perform the bone weight calculation operation for the first pixel and the second 3D structure to produce a second bone weight;
wherein the first transformed cartesian coordinate and the second transformed cartesian coordinate are aggregated based on the first bone weight and the second bone weight.

11. The computer apparatus of claim 8, wherein when executed by the one or more processors the instructions cause the one or more processors further to:
obtain a second cartesian coordinate formed by concatenating a second 2D pixel position in the 2D source image and a second depth value;
apply the first 3D rotation offsets to the second cartesian coordinate in order to obtain a second transformed cartesian coordinate;
separate the second transformed cartesian coordinate into a second transformed two-dimensional (2D) pixel position and a second transformed depth value;
draw a second pixel to the transformed 2D image, wherein the second pixel has the second transformed 2D pixel position in the transformed 2D image; and
depth sort the first pixel and the second pixel after separating the first transformed cartesian coordinate and after separating the second transformed cartesian coordinate.

12. The computer apparatus of claim 8, wherein when executed by the one or more processors the instructions cause the one or more processors further to:
upscale an original two-dimensional (2D) image to produce the 2D source image.

13. The computer apparatus of claim 8, wherein when executed by the one or more processors the instructions cause the one or more processors further to:
perform a height map calculation operation on the 2D source image to produce a height map image, wherein the first depth value of the first cartesian coordinate of the first pixel is calculated based on the height map image.

14. The computer apparatus of claim 8, wherein when executed by the one or more processors the instructions cause the one or more processors further to:
map the 2D source image to the first 3D structure.

15. A computer program comprising executable instructions stored in a non-transitory computer readable medium that when executed by one or more processors causes the processor to:
select a two-dimensional (2D) raster-art source image;
select a first three-dimensional (3D) structure;
read first 3D rotation offsets which describe a desired orientation of the first 3D structure relative to an initial orientation of the first 3D structure;
obtain a first cartesian coordinate formed by concatenating a first 2D pixel position in the 2D source image and a first depth value;

apply the first 3D rotation offsets to the first cartesian coordinate in order to obtain a first transformed cartesian coordinate;

separate the first transformed cartesian coordinate into a first transformed two-dimensional (2D) pixel position and a first transformed depth value; and draw a first pixel to a transformed two-dimensional (2D) image, wherein the first pixel has the first transformed 2D pixel position in the transformed 2D image, wherein the transformed 2D image is generated in a coordinate space without use of a 3D model.

16. The computer program of claim 15, wherein when executed by the one or more processors the instructions cause the one or more processors further to:

select a second three-dimensional (3D) structure in the selected 2D source image;

read second 3D rotation offsets which describe a second desired orientation of the second 3D structure relative to a second initial orientation of the second 3D structure;

apply the second 3D rotation offsets to the first cartesian coordinate in order to obtain a second transformed cartesian coordinate;

aggregate the first transformed cartesian coordinate and the second transformed cartesian coordinate in order to obtain an aggregated transformed cartesian coordinate;

convert the aggregated transformed cartesian coordinate to an aggregated transformed two-dimensional (2D) pixel position and an aggregated transformed depth value; and draw the first pixel to a transformed two-dimensional (2D) image, wherein the first pixel has the aggregated transformed 2D pixel position in the transformed 2D image.

17. The computer program of claim 16, wherein when executed by the one or more processors the instructions cause the one or more processors further to:

perform a bone weight calculation operation for the first pixel and the first 3D structure to produce a first bone weight; and perform the bone weight calculation operation for the first pixel and the second 3D structure to produce a second bone weight;

wherein the first transformed cartesian coordinate and the second transformed cartesian coordinate are aggregated based on the first bone weight and the second bone weight.

18. The computer program of claim 15, wherein when executed by the one or more processors the instructions cause the one or more processors further to:

obtain a second cartesian coordinate formed by concatenating a second 2D pixel position in the 2D source image and a second depth value;

apply the first 3D rotation offsets to the second cartesian coordinate in order to obtain a second transformed cartesian coordinate;

separate the second transformed cartesian coordinate into a second transformed two-dimensional (2D) pixel position and a second transformed depth value;

draw a second pixel to the transformed 2D image, wherein the second pixel has the second transformed 2D pixel position in the transformed 2D image; and depth sort the first pixel and the second pixel after separating the first transformed cartesian coordinate and after separating the second transformed cartesian coordinate.

19. The computer program of claim 15, wherein when executed by the one or more processors the instructions cause the one or more processors further to:

upscale an original two-dimensional (2D) image to produce the 2D source image.

20. The computer program of claim 15, wherein when executed by the one or more processors the instructions cause the one or more processors further to:

perform a height map calculation operation on the 2D source image to produce a height map image, wherein the first depth value of the first cartesian coordinate of the first pixel is calculated based on the height map image.

21. The computer program of claim 15, wherein when executed by the one or more processors the instructions cause the one or more processors further to:

map the 2D source image to the first 3D structure.

* * * * *